(12) United States Patent
Cohen et al.

(10) Patent No.: US 9,630,324 B2
(45) Date of Patent: Apr. 25, 2017

(54) ENHANCED SYSTEM AND METHOD FOR CONTROL OF ROBOTIC DEVICES

(71) Applicant: SKUR, Inc., Oakland, CA (US)

(72) Inventors: Adam Cohen, Oakland, CA (US); James L. Barber, Spokane Valley, WA (US); Michael A. Singer, Belmont, CA (US); Daniel Chavez, Berkeley, CA (US); Farid W Saddik, Santa Clara, CA (US); James Creasy, Berkeley, CA (US); Alan Gushurst, Pleasanton, CA (US)

(73) Assignee: SKUR, Inc., Oakland, CA (US)

( * ) Notice: Subject to any disclaimer, the term of this patent is extended or adjusted under 35 U.S.C. 154(b) by 0 days.

(21) Appl. No.: 14/619,035

(22) Filed: Feb. 10, 2015

(65) Prior Publication Data
US 2015/0273693 A1  Oct. 1, 2015

Related U.S. Application Data

(60) Provisional application No. 61/972,201, filed on Mar. 28, 2014.

(51) Int. Cl.
| | |
|---|---|
| *G06F 19/00* | (2011.01) |
| *B25J 13/00* | (2006.01) |
| *B25J 9/16* | (2006.01) |
| *H04L 29/08* | (2006.01) |

(52) U.S. Cl.
CPC ........... *B25J 13/006* (2013.01); *B25J 9/1661* (2013.01); *B25J 9/1689* (2013.01); *B25J 9/1697* (2013.01); *H04L 67/12* (2013.01); *Y10S 901/47* (2013.01)

(58) Field of Classification Search
CPC ....... G06F 19/00; B25J 9/1661; B25J 9/1689; B25J 9/1697; B25J 13/006; Y10S 901/47; H04L 67/10
See application file for complete search history.

(56) References Cited

U.S. PATENT DOCUMENTS

| | | | |
|---|---|---|---|
| 2006/0116842 A1* | 6/2006 | Tarantola | G01D 21/00 702/122 |
| 2012/0277900 A1* | 11/2012 | Catoen | B29C 45/73 700/202 |
| 2013/0034305 A1* | 2/2013 | Jahanshahi | G06K 9/00624 382/201 |

* cited by examiner

*Primary Examiner* — Yuen Wong
(74) *Attorney, Agent, or Firm* — Galvin Patent Law LLC; Brian R. Galvin

(57) ABSTRACT

A system for robotic device control and data acquisition, comprising a robotic device control system adapted to receive sensor-based data comprising physical object information, the sensor-based data being received from a plurality of sources, each source comprising at least a physical sensor in communication with the robotic device control system computer via a communications network, an enhanced robotic device control application adapted to receive sensor-based data from the robotic device control system computer and manipulate the sensor-based data to produce enhanced data, and a method for robotic device control and data acquisition.

7 Claims, 19 Drawing Sheets

ENHANCED SYSTEM AND METHOD FOR CONTROL OF ROBOTIC DEVICES

CROSS-REFERENCE TO RELATED APPLICATIONS

This application claims the benefit of, and priority to, U.S. provisional patent application Ser. No. 61/972,201, titled "SYSTEM AND METHOD FOR PLANNING AND CONTROLLING MISSIONS BY ROBOTIC DEVICES" and filed on Mar. 28, 2014, the entire specification of which is incorporated herein by reference.

BACKGROUND OF THE INVENTION

Field of the Art

The invention relates generally to the field of robotics and more particularly to the field of robotic physical data acquisition.

Discussion of Prior Art

In the art of robotics, it is a common practice to manually control robotic devices or appliances remotely, for example in radio-controlled vehicles, surveillance drones, and similar devices. It is a common practice to collect data using these devices, for example by utilizing a drone-mounted camera to record photographic information, or microphones to record acoustic information. However, in the art there is no way to unify the gathered data, for example to model buildings and their systems using remotely controlled robotic devices or appliances. What is needed, is a way to combine collected data into an accessible format for use, for example, to enable enterprises to plan, schedule and verify preventive maintenance, supply chain, subcontractors, scheduling, enhanced object model libraries, ongoing management optimization, anomaly detection, and other such purposes. For example, HVAC motor sensors could be timed to optimize scheduling intervals.

SUMMARY OF THE INVENTION

The inventor has conceived, and reduced to practice, in a preferred embodiment of the invention, a system and method for robotic device control and data acquisition.

In a preferred embodiment of the invention, a system for robotic device control and data acquisition, comprising a robotic device control system computer comprising program code stored in a memory and adapted to receive sensor-based data comprising physical object information, the sensor-based data being received from a plurality of sources, each source comprising at least a physical sensor in communication with the robotic device control system computer via a communications network; an enhanced robotic device control application computer comprising program code stored in a memory and adapted to receive sensor-based data from the robotic device control system computer and manipulate the sensor-based data to produce enhanced data; and a database computer comprising program code stored in a memory and adapted to store data received from the robotic device control system and the enhanced robotic device control application, is disclosed. The ERDCS enhances user interaction by enabling visualization of problems and data from various sources including, but not limited to, spreadsheets, project charts, etc., for example to search for all activities required across typical "silos" or trades (i.e., metal guy vs concrete guy, etc.) in the industry.

According to another preferred embodiment of the invention, a method for robotic device control and data acquisition, comprising the steps of receiving, at a robotic device control system, a plurality of sensor-based data; processing the sensor-based data; storing, in a database computer, the sensor-based data; and converting, using an enhance robotic device control application, between a vectorized and a sparse-point model in a two-way reversible manner, at least the sensor-based data, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
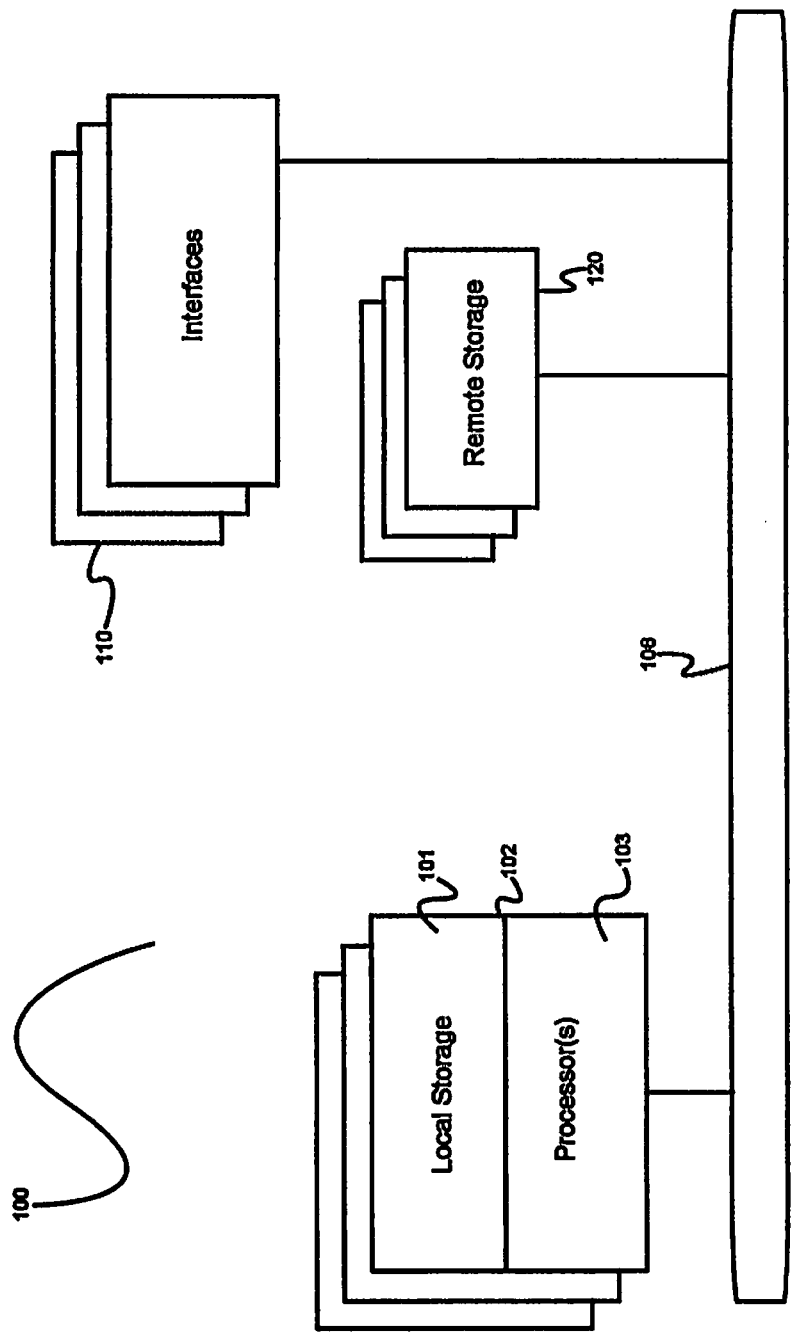
FIG. 1 is a block diagram illustrating an exemplary hardware architecture of a computing device used in an embodiment of the invention.

The inventor has conceived, and reduced to practice, in a preferred embodiment of the invention, a system and method for robotic device control and data acquisition.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

In some cases, a system for processing data coming from various sources and related to physical objects, such as, for example, buildings or civil engineering objects, including but not limited to bridges, roads, support and retaining walls, railroads, airports, etc., can be converted into a sparse point cloud model that combines all the source data. Then superfluous data points, specifically points with no properties, can be removed as noise from the sparse point cloud model to make it smaller and more manageable. Further, conversion routines could enable interactions between the sparse point cloud model and a vectorized object model for better manipulation, editing, etc.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it becomes readily apparent that more than one device or article may be used in place of a single device or article. Similarly, where more than one device or article is described, it is likewise readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein may sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
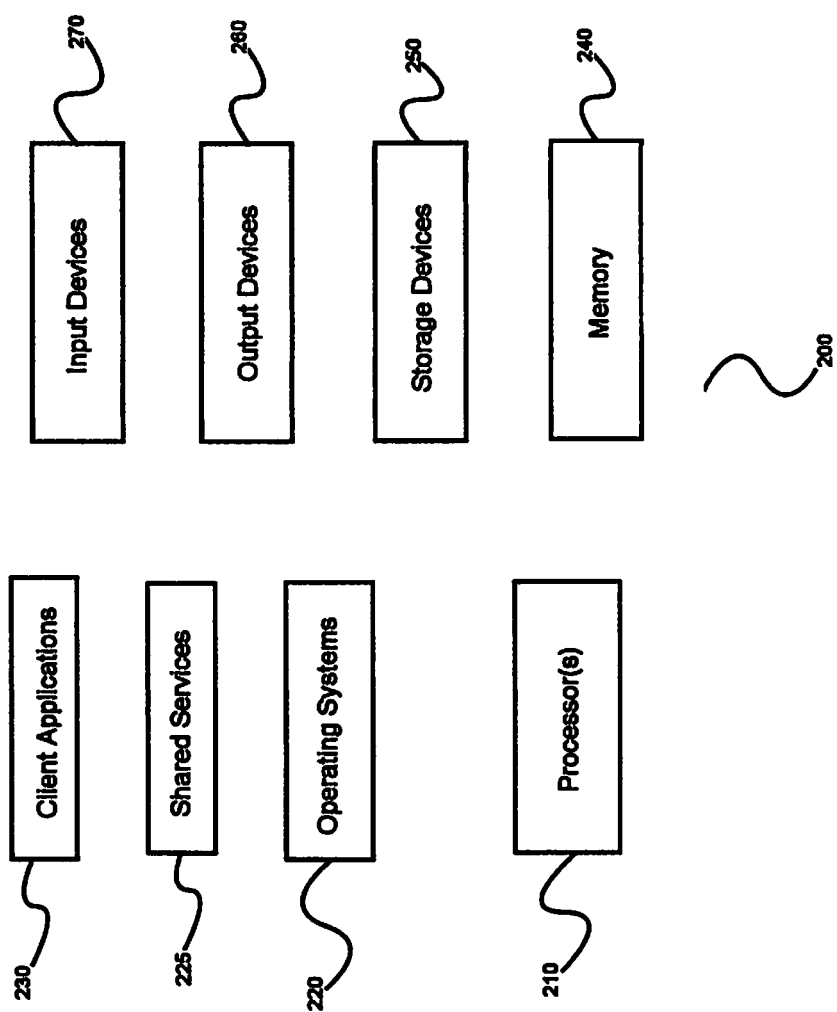
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
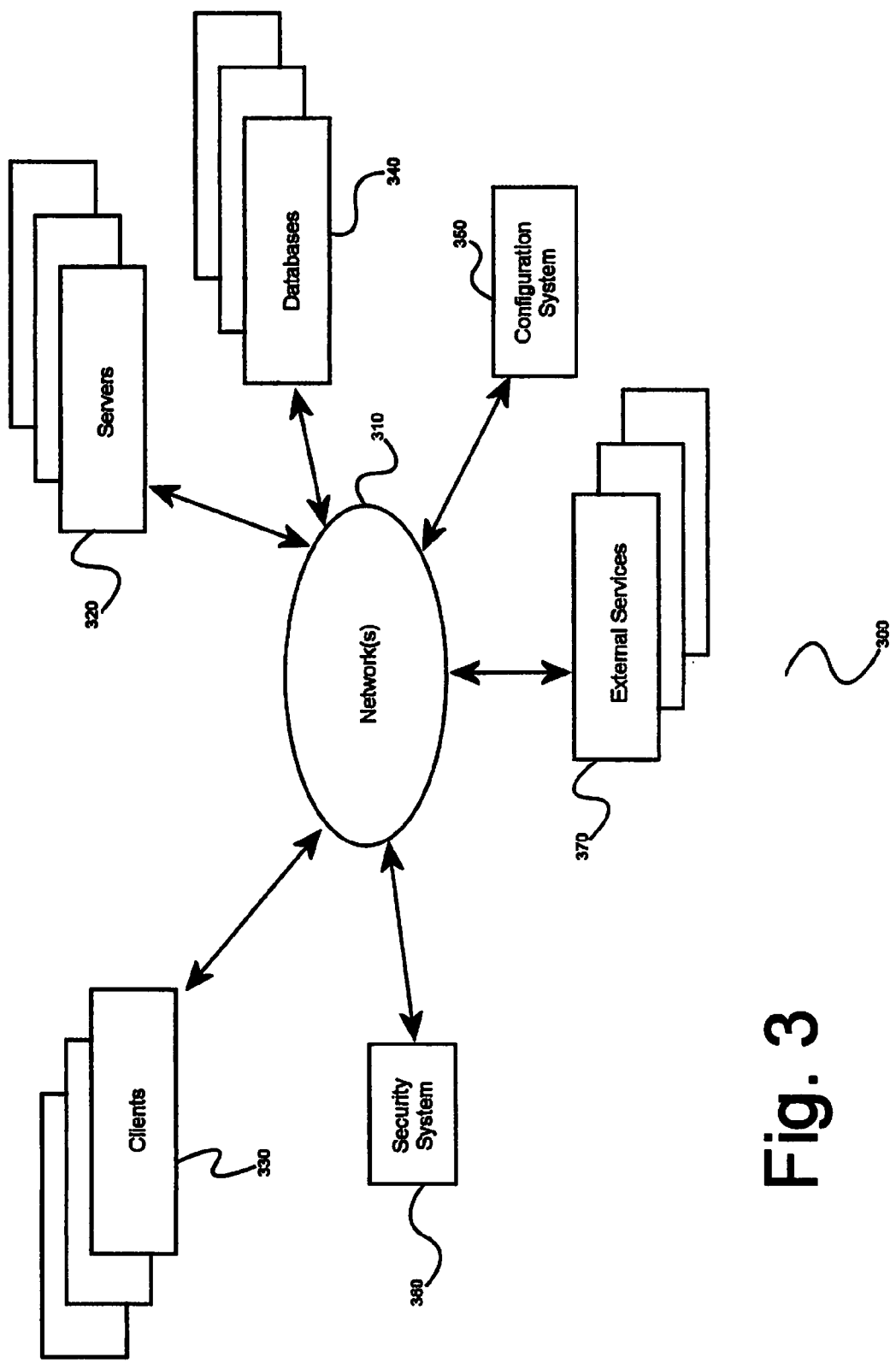
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop/HDFS, Apache Spark, hBase, MongoDB, Cassandra, Google BIGTABLE™, and so forth). In some embodiments, variant database architectures such as column-oriented databases, in-memory databases, clustered databases, distributed databases, or even flat file data repositories may be used according to the invention. It may be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
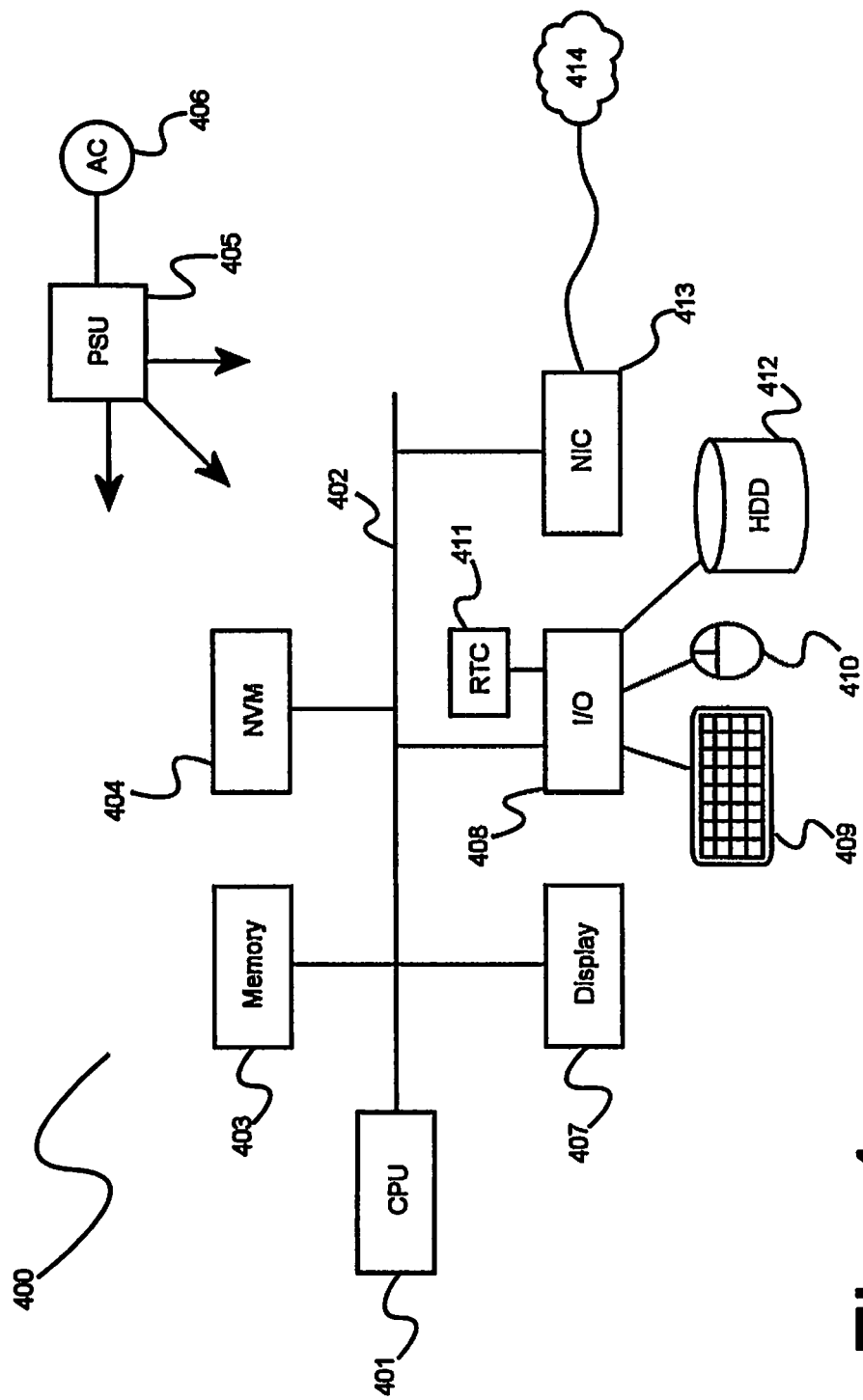
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
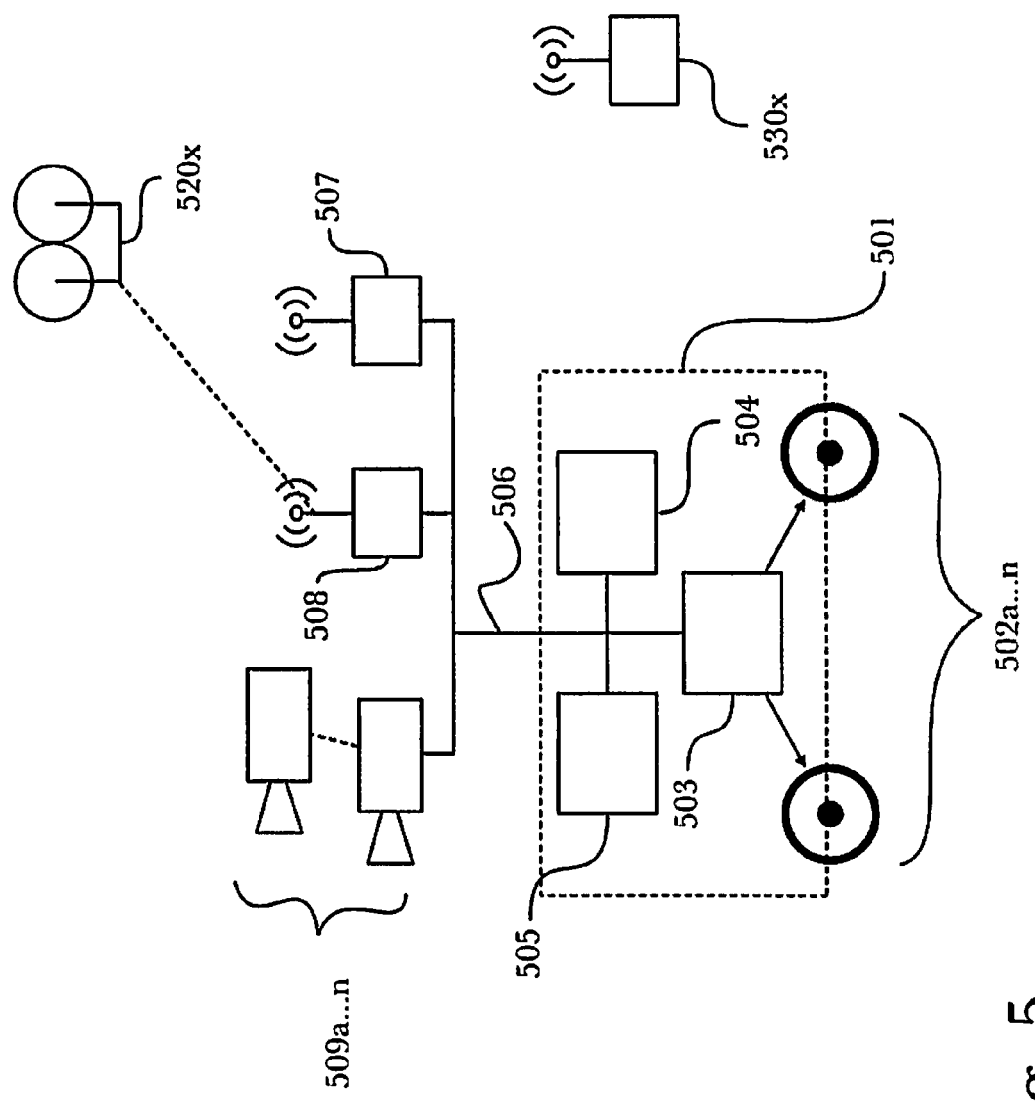
FIG. 5 is an overview of a system for a remotely controlled moveable vehicle, according to an embodiment of the invention.

FIG. 5 shows an overview of a system 500 for a remotely controlled moveable vehicle, according to an embodiment of the invention. Moveable vehicle 501 has a movement control unit 503. Devices 502a-n, which could be wheels or other things such as blades for helicopters, may be arrayed as, for example, a quadcopter or hexcopter with multiple rotary blades, a land based rover with four, six, eight or more wheels, or with one, two, four, eight or more turbines for water-based vehicles, or as any other of various arrays of traction or locomotion systems. Moveable vehicle 501 may include a controller 504, a battery 505, an internal bus 506, and additional sensors 509a-n, such as, for example, active sensors, e.g., LiDAR or passive sensors, such as cameras. Vehicle 501 also may have a radio communication unit 507 and GPS communication unit 508. Note that not every instance of moveable vehicle 501 necessarily has all the previously mentioned component devices. A base unit 530x may communicate with unit 507 to send data, commands, and other communications to controller 504. Not shown in great detail are all the controls for motion command, which can vary greatly, but which essentially enable to vehicle 501 to move in a predefined way, either by flying or by moving on the ground.

Figure 6:
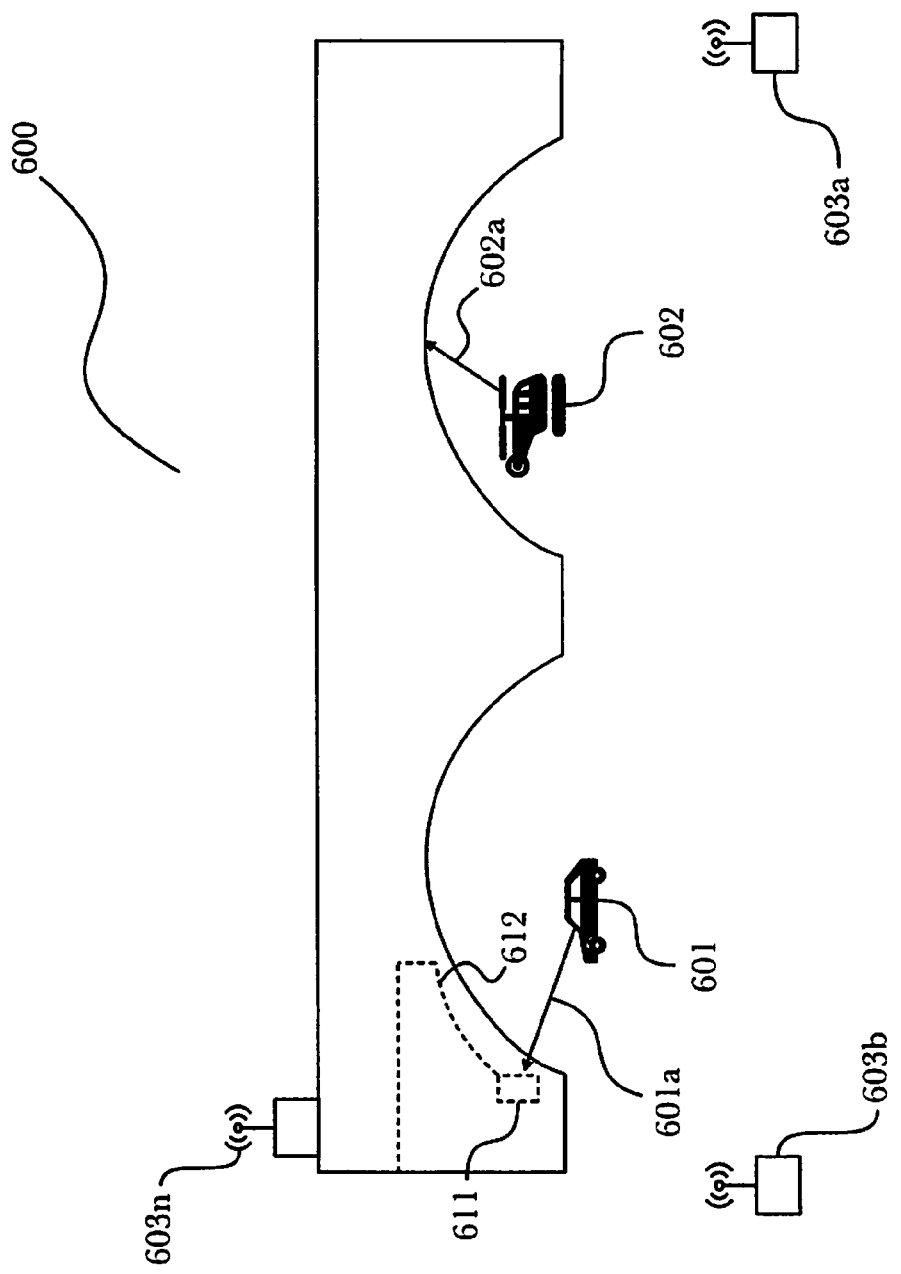
FIG. 6 is an overview of an exemplary exploratory mission, according to an embodiment of the invention.

FIG. 6 shows an overview of an exemplary exploratory mission 600, according to an embodiment of the invention. Exemplary ground-based or flying vehicles 601 and 602 are exploring, in this case, a stylized bridge 610 with two arches. In the bridge are exemplary features as such as electrical connections 611 and buried wires 612. Mounted on vehicles 601 and 602 are sensors (such as previously discussed 509a-n) that can, for example, detect the shapes of outlets (with cameras) or measure electric fields (with electric field sensors or antennae) emitted from outlets or from invisible wiring. Also at the mission site are for example a few radio beacons 603a,b, and n. One land-based vehicle 601 rolling on wheels has sensor 601a trained on electrical outlet 611, while vehicle 602, an aerial copter of some type, has some of its sensors investigating the arch surface, as indicated by arrow 602a. The investigating devices could be as simple as a camera looking at the structure, or some other types of sensors, or a combination of such investigative devices. They may employ both low-altitude aerial and close range terrestrial photogrammetry, using a range of wavelengths, such as, for example, visible light, multispectral or extraspectral. Creating a lot of pictures enables the system to stitch the surface images into a large image showing all details in very high resolution, as well as enabling to creation of three-dimensional wireframes of an object. In some cases the images may be in continuous, high-definition video, while in other cases the images may be one or more discrete high-definition photographs, or a combination of the two. Even if only a video is shot, applications for photo-stitching, such as, for example, Pix4D mapper, ArcGIS from ESRI, or 123D Catch from Autodesk can be used to create a three-dimensional image and/or a wireframe with texture mapping of the investigated object, showing texturing and other features in very high resolution.

Figure 7:
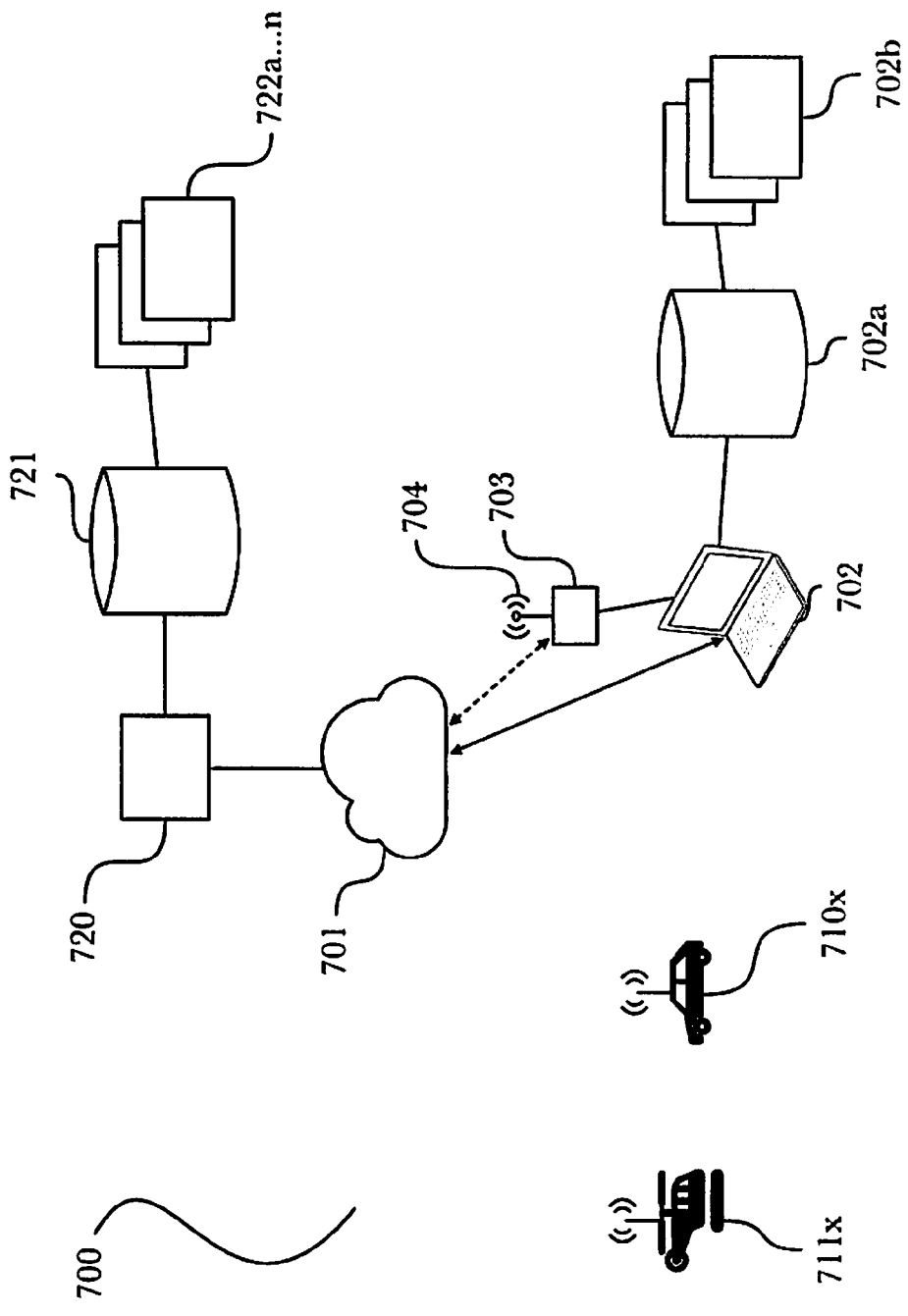
FIG. 7 is an illustration of an operational viewpoint of a mission, according to an embodiment of the invention.

FIG. 7 shows an operational viewpoint of a mission 700, according to an embodiment of the invention. Device 711x, in this example a quadcopter and rolling vehicle 710x are both equipped with wireless communication capabilities. Depending on the type or scope of the mission, only aerial, terrestrial or aquatic (not shown here) vehicles may be used on that mission, or as necessary, a combination of one or more vehicles in one or more of said categories of vehicles. One of the beacons 703 (sending a signal 704) is attached to a laptop computer 702, which is connected via Internet 701 to a server 720. Exemplary signal 704 is a radio signal in this example, but it may, depending on circumstances, be one or more of radio signals, optical, and/or acoustical signals. For example, if a high-voltage site needs to be investigated, infrared or ultraviolet beacons and/or communications may be preferred over radio signals, whereas in an underwater situation, sounds may be the preferred type of signal. Server 720 may be a physical server, or it may be a cloud-based service, as in a storage or application cloud, not to be confused with point cloud, or a site-based service or any of various devices capable of performing a similar server function. The server has a storage unit 721 that may contain a large quantity of data for the mission; additionally, some mission data may be stored locally in storage unit 702a on computer 702. Also on storage unit 721 are programs and data sets 722a-n, which could include the operating system for server 720 as well as data for multiple customers and their missions. Some data relevant to the mission may be downloaded to local storage unit 702a and stored as data objects 702b a-x. In other cases, data may be downloaded directly from the cloud service and sent via wireless beacon 703 and signal 704 to vehicles 710a-n or 711a-n (or other types not shown in this figure), or combinations thereof. Depending on the individual situation, any of the above-described approaches may be employed, as well as any combination thereof.

Figure 8:
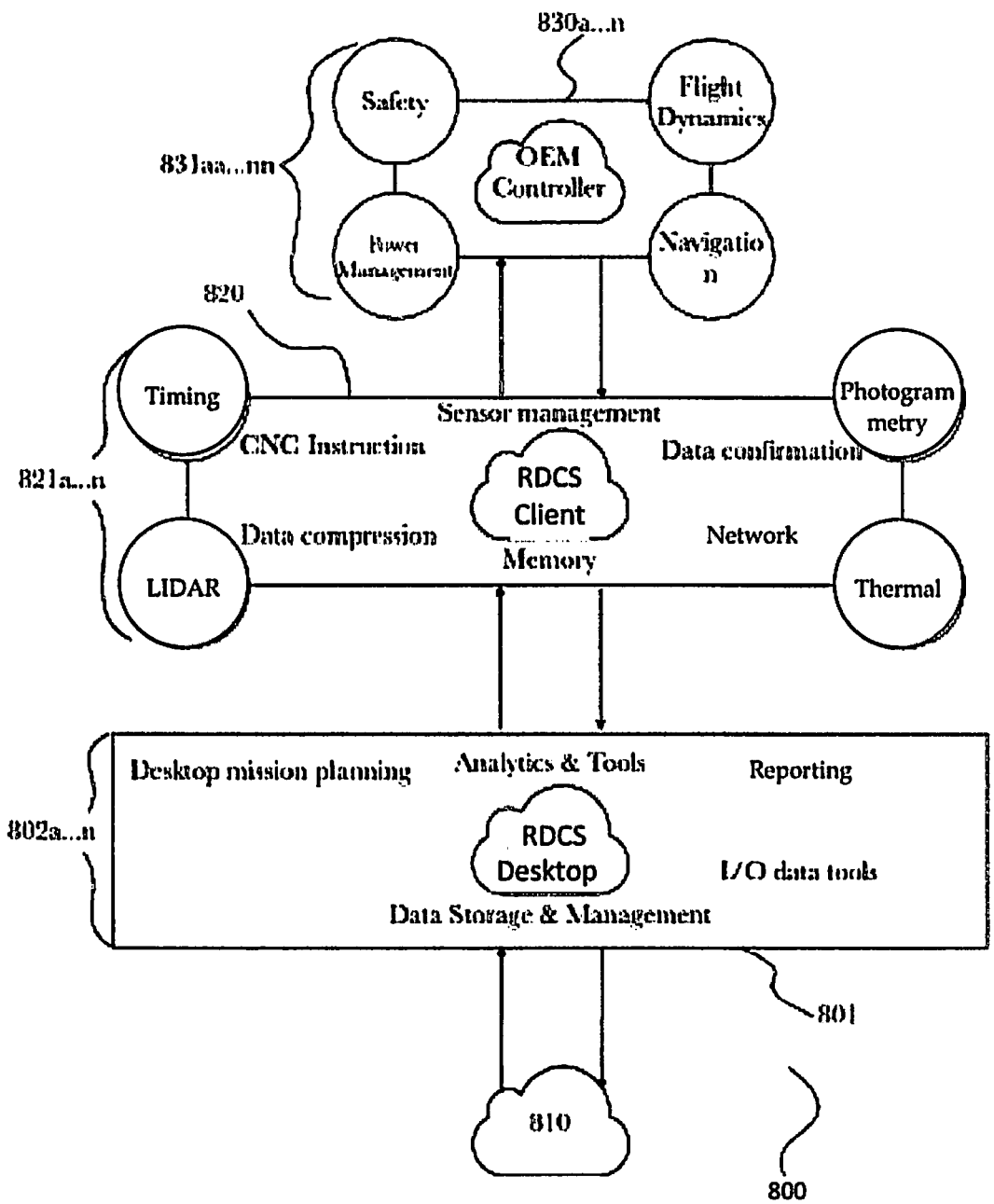
FIG. 8 is an architectural diagram of an exemplary system for robotic control and data acquisition, according to an embodiment of the invention.

FIG. 8 is an architectural diagram of an exemplary system 800, according to an embodiment of the invention. Architectural layer 801 is the System Desktop, containing modules 802a-n, including Desktop Mission Planning, Data Products, Analytics & Tools, Data Storage & Management, Sensor & Rover Optimization, and I/O Data Tools. Within exemplary Internet cloud 810 could reside any and multiple types of computer-aided design (CAD) and/or building information management (BIM) systems. From the system desktop 801 mission software and data, as well as software updates, direct commands, etc. can go to vehicle client(s) 820 (only one shown here for clarity), with modules 821*a-n*, including CNC Instruction, Data Compression, Sensor Management, Memory, Data Confirmation, and I/O, Timing, LiDAR, Photogrammetry, and Video. Some of these modules 821*a-n* may be client-based, while others may be based on the System Desktop or on the control computer. The Desktop may reside physically on a local computer, or it may be a virtual desktop in the cloud (as a service), interfacing with the other software. From the Vehicle Client 820 programs and/or commands can be sent to the controllers 830*a-n* (typically more than one controller per vehicle, with often at least one controller per means of traction, as well as one or more additional controllers for sensors) that actually control such functions as Safety, Power Management, Flight Dynamics if flight is involved, Navigation, motors, wheels, GPS, sensors, and driving dynamics if it's a land-based vehicle.

Figure 9:
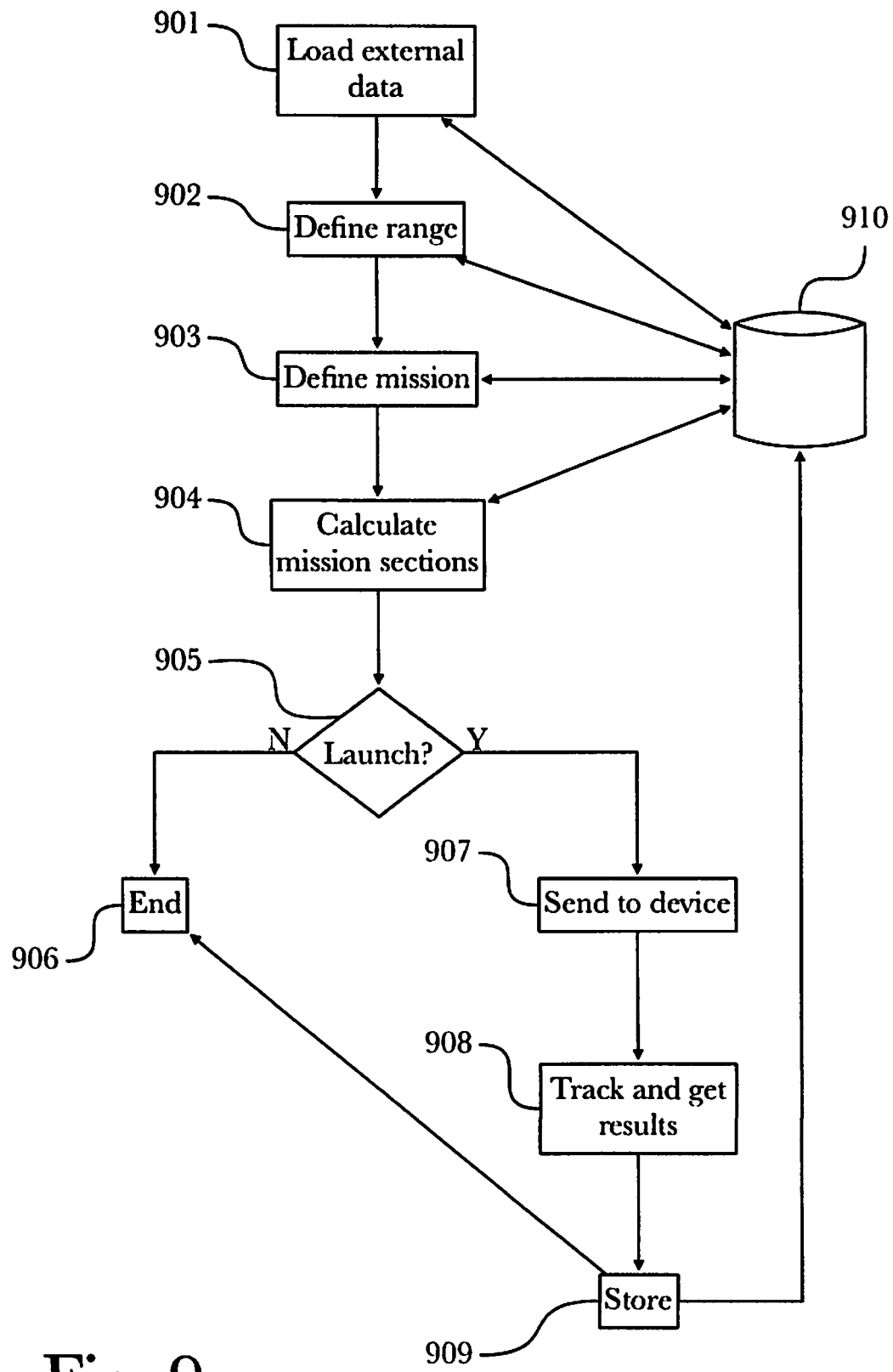
FIG. 9 is a method flow diagram illustrating an exemplary process for preparation for a mission, according to an embodiment of the invention.

FIG. 9 shows an exemplary process 900 for preparation for a mission, according to an embodiment of the invention. In this process typically parameters for each mission are defined, such as starting position, ending position, average distance from structure, average speed, pass separation, distance between passes for longer-range sensors, type of vehicle, maximum altitude, movement range and time, acceleration vectors, and braking vectors. In step 901 external data is loaded from, for example, a CAD or BIM system. In some cases, typically when no useable BIM or CAD data exists, photometric data, taken from snap shots of an object and used to create a rough two-dimensional or three-dimensional map of the object may be used as the primary data for the mission. The computer, as part of the mission planning, may generate an initial three-dimensional file to build an internal model of a structure and establish whether the vehicles can make clear movement passes around the solid parts of the structure. Additionally, the computer prompts the user to create obstruction zones as required for safety around such obstacles as power lines, cranes, construction superstructures, etc. (not shown for clarity in FIG. 6) The computer then processes a three-dimensional file to determine mission feasibility, based on the capabilities of various vehicles intended for that mission. Subsequently, the three-dimensional file is processed again, using corrected and smoothed input data to create a series of waypoints at the desired resolution (i.e., one per meter, 10 per meter, etc.), with each waypoint an absolute location (as best determined by available data). In addition, the file may contain a three-dimensional heading and speed vector structure and a relative timestamp. In step 902 a range is defined, and in step 903 a mission is defined, so that the system now has definitions such as at what range, using what types of scanning, etc. The output file should be as "vehicle agnostic" as possible, although it is understood that many mission parameters are required in advance. For example, it must be known in advance whether the mission is airborne, ground-based, water-borne or any combination thereof. The exact specifications of the vehicle may not be known at the time the mission is created, so reasonable "real world" assumptions must be made while processing the mission path. For example, a battery provides nominally for 20 minutes of flight time for a specific UAV, but due to wear and tear, as well as the temperature on the day of the mission, actual useable battery capacity may be easily 20-30% less, and needs to be accounted for. Also, external things, like stronger than expected winds on the day of the mission may wear batteries down faster than expected etc. In step 904, based on the capabilities of the system devices, such as range, battery power, and other various circumstances, such as wings on a flying vehicle that increase power consumption, steep terrain that may require additional battery power on land-based vehicles, etc., the mission is then sectioned, that is, partitioned into sets of tasks that a single vehicle can perform safely, within the expected battery, spatial, and temporal range limits, and in step 905 the system checks to determine whether the mission can be launched. If the mission cannot be launched (no), the process ends at step 906. If the mission is ready to launch, then in step 907 the system sends the first section of a mission to the vehicle(s). In step 908 the system tracks the behavior of the vehicle(s) and in step 910 the system stores the tracking data in data repository 910. The process then loops back to step 905 and repeats until all mission sections are complete, at which point the process ends at step 906. In some cases, batteries may be changed or re-charged between each mission section. In other cases, different mission sections maybe allocated to different vehicles, for example, alternating at performing tasks and charging batteries, or in yet other cases a large number of vehicles may each perform one section in parallel with others, concurrently.

Figure 10:
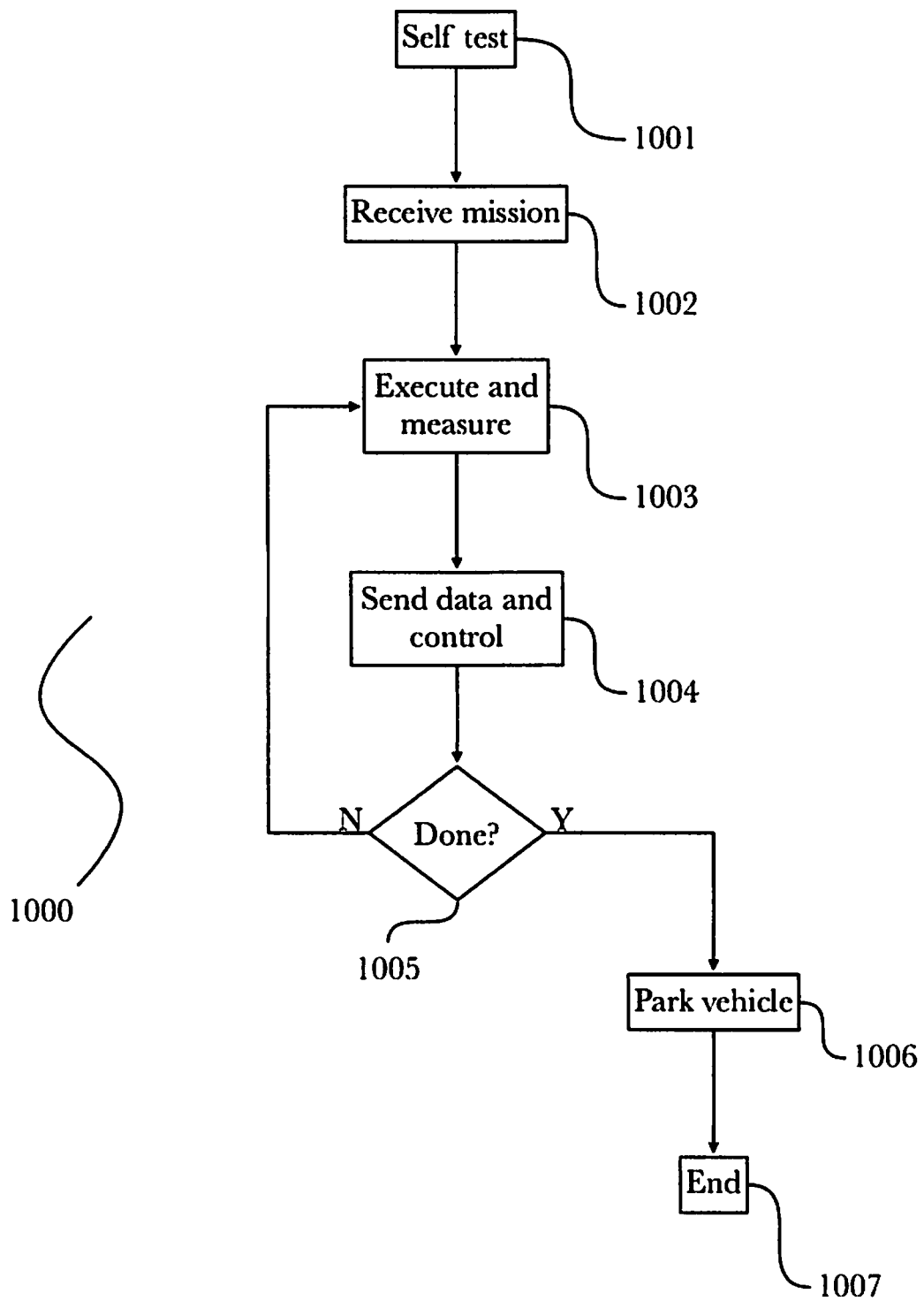
FIG. 10 is a method flow diagram illustrating an exemplary process of the functions of a vehicle processor to prepare and execute a mission.

FIG. 10 shows an exemplary process 1000 of the functions of a vehicle processor to prepare and execute a mission as described in the discussion of layer 830*a-n* in FIG. 8, according to an embodiment of the invention. In step 1001 the system executes a vehicle self-test, to determine that, for example, the vehicle has sufficient battery power, is in the correct location, has access to telemetry such as, for example, GPS or local beacons, or a combination of the two, and any other functions and materials required for the mission. In step 1002 the vehicle receives the mission and verifies that the vehicle state as determined by the self-test is adequate to complete the mission. In step 1003 the system executes the program and measures the resulting data. In step 1004 the system sends data back to local storage and/or to storage in the cloud. The system also sends various control data to verify that the mission is proceeding as expected. In step 1005 the system checks to determine whether the mission is completed. If the mission is not completed (no), the process loops back to step 1003. In some cases, the system may receive additional mission instructions, while in other cases, the system may simply continue to execute existing instructions. If, in step 1005, the system determines that the mission is finished (yes), the system parks the vehicle safely, usually at a predetermined location, in step 1006; and in step 1007 the mission ends.

In some cases, in a system for processing data related to physical objects from multiple sources, the data may be converted into a sparse point cloud mode that contains all the data combined. These physical objects may be, for example, buildings or civil engineering objects, such as bridges, roads, support and retaining walls, railroads, airports, etc. Then superfluous data points, in particular, points with no properties, may be removed as noise from the sparse point cloud model to make it smaller and more manageable. In some cases, conversion routines may enable a back and forth between the sparse point cloud model and a vectorized object model for better manipulation, editing, etc. Further, the data may be combined into a Mission Configuration File, which is a formatted text file that contains information about mission-specific and platform configuration, including relative location of data collection devices on a platform, number of devices, types of devices, frequency of readings, location of data collection device's persistent data, names of output files, mission origin information, model information to facilitate later association of data, unit information, information on initializing or controlling possible third platform control applications related to data collection device, and possible data collection device conveyance. Combining the data enables the system to define all the geometric, platform, data collection device and third party API information required to start a mission. The resulting mission record is necessary for performing accurate data association for a multiple data collection device platform despite optional conveyance of the platform. Additionally, in an RCDS, a Mission Record Flat File in a form of a formatted text file, contains the mission record, which contain the whole Mission Configuration File, metadata generated about the mission during a mission (such as start and end time of mission, additional positional data, e.g., additional monuments, initial and final position and orientation of platform, data collection device data records, possible continuous positional information, e.g., as collected by an IMU unit), source locations of the data records, data sheet information with specifications of configured data collection devices, log of errors and warning encountered during processing, data integrity checking information, file format version information, and names of all output files. Then a computer program module that is part of the RCDS takes the Mission Configuration File as input and uses it as the basis to build an in-memory structure of metadata aggregating the artifacts of a mission in a way that scales appropriately for at least some of the types of data. Further, a decision whether to build an in-memory structure, using a standard data format, such JSON, is primarily based on the size of the files. In some cases, it may be preferable to keep the data in separate files, and only keep references or internal URLs pointing to the data files. The file design enables definition of a single record spanning all aspects of a mission, such as mission configuration, traceability information, positional information, such as that needed to perform accurate data association, platform configuration, data collection device specifications, mission data output, domain-specific information, such as additional monument definition, mission metadata such start and end time of mission, name, description, and data integrity checks. Also, in an ERDCS, a Model File, containing text only, may be capable of holding information found in one or more CAD model files, such as .dwg, .dgn, .stp file types. This file is capable of lossless translation, as well as holding optional associated data from collection devices such that the associated data is positionally registered with the design model. This Model File may be used to find problems during construction. Further, a computer program that reads existing formats for CAD models files can also inject ERDCS mission-generated data with persistence in any number of user-requested formats. Also, a wide variety of different sensor data can be associated with a wide variety of persistent formats and augment design models that may contain vector entities.

Platform

Figure 11:
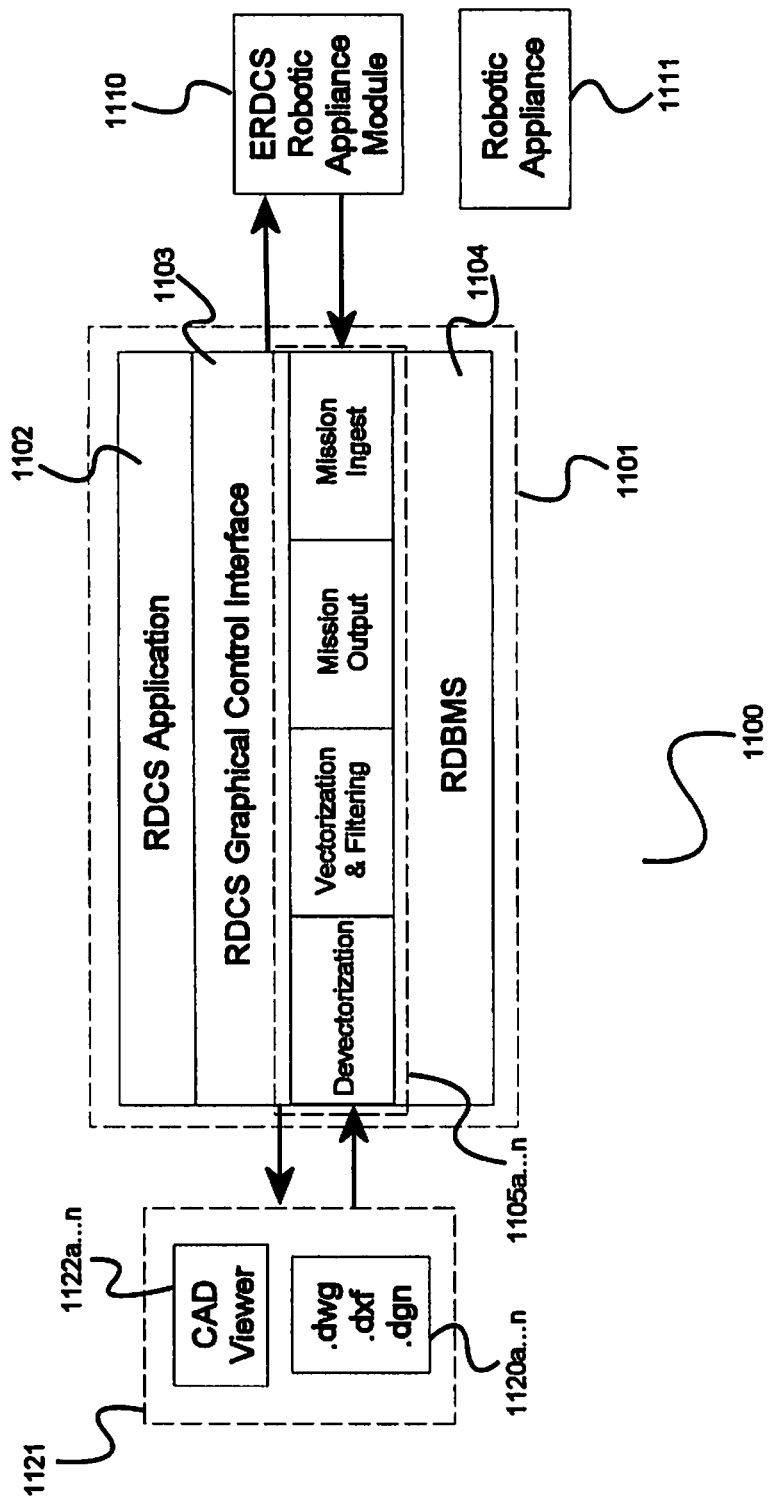
FIG. 11 is a system diagram illustrating a high-level architectural overview of an expanded robotic device control system (ERDCS), according to an embodiment of the invention.

FIG. 11 shows a high-level architectural overview of the expanded robotic device control system (ERDCS) 1100, according to an embodiment of the invention. Some of the expanded functionality may be used in situations that do not involve any robotic devices and that may use data from other sources, including but not limited to manually collected data, fixed position LiDARs, scanned documents, etc. Comprising software stack 1101 are main ERDCS application 1102, ERDCS graphical control interface 1103, and relational database management system (RDBMS) 1104. Although this description specifies an RDBMS throughout, any other suitable databases may be used, such as, for example, memory databases, big data, cloud databases, etc. None of the features of the system and method disclosed herein absolutely requires a relational database, and other more scalable database systems may be used interchangeably, such as, for example, Mongo, Hadoop, Spark, Dynamo, etc. Also included in software stack 1101 are modules 1105a-n for devectorization and vectorization filtering. These modules can interface back and forth with vector-based CAD systems such as 1122a-n, running on computing device 1121 and using file formats 1120a-n, which may be, for example, .dwg, .dxt, .dgn, etc. ERDCS robotic appliance 1111 likewise uses ERDCS Robotic Appliance module 1110.

Figure 12:
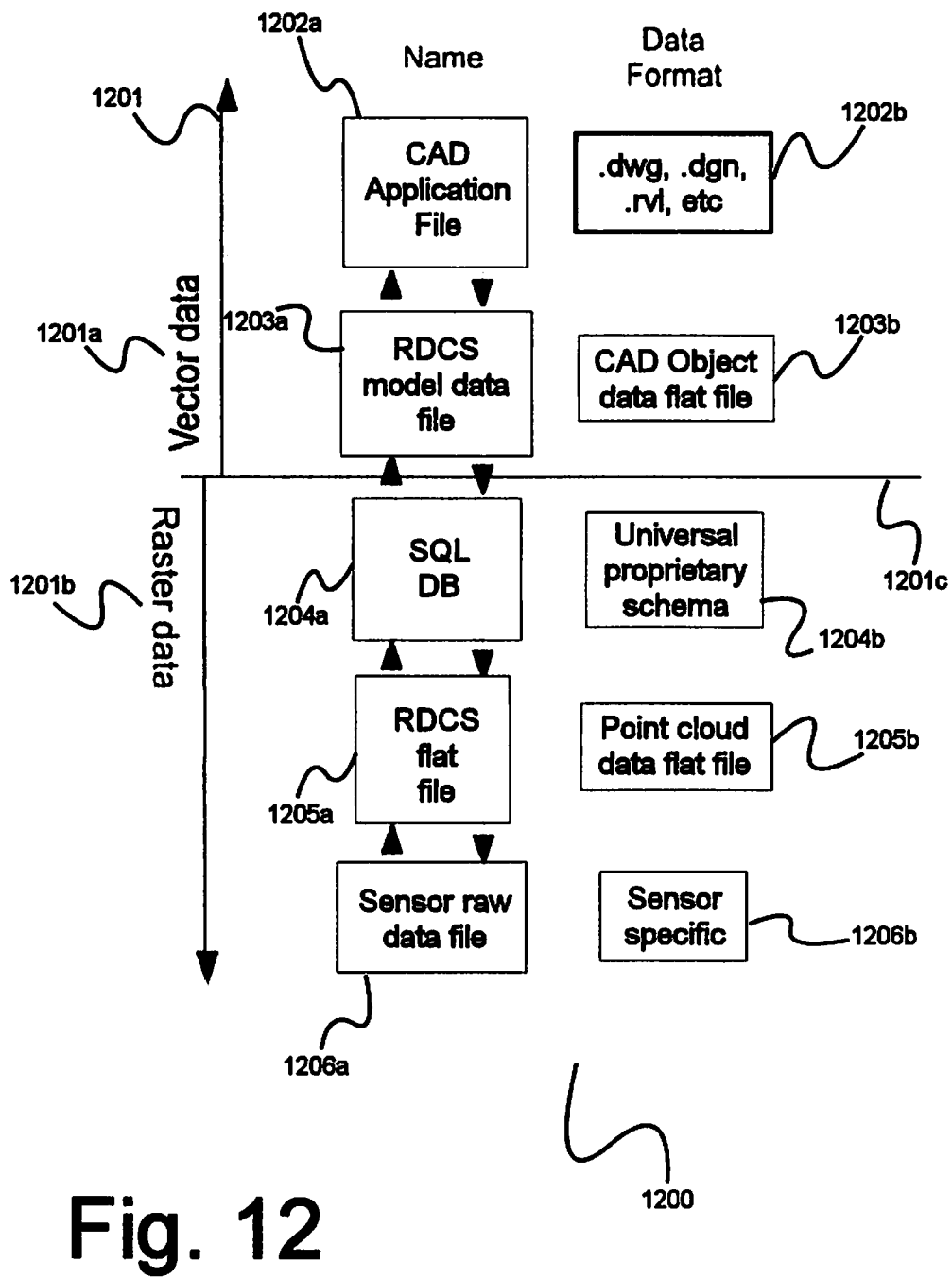
FIG. 12 shows a more detailed architectural overview of ERDCS data flow, according to an embodiment of the invention.

FIG. 12 shows a slightly more detailed architectural overview of ERDCS data flow 1200, according to an embodiment of the invention. In paired vertical columns are, on the left side, are file types, and on the right side, data formats typically associated with the respective file types. Above horizontal demarcation line 1201c is typically vector data 1201a, and below the line is raster data 1201b, but in some cases both and vector data maybe be layered in together. Raster data may also include data types such as point cloud data, as each point has its own coordinate and thus is typically raster-type data, but point cloud data may be used for points in a vector model, which have x,y,z like points. CAD application file types 1202a, at the top right, are associated with file extensions 1202b, such as .dwg, .dgn, .rvt, .dxt, etc. Next, ERDCS model data file types 1203a are associated with CAD object data flat files 1203b and may or may not include original RDCS model data files for all implementations, as some services do not use or require it for all file types. Database files, such as, in this example, SQL database files 1204a, are associated with universal proprietary data schema 1204b. ERDCS flat file 1205a is associated with, typically, point cloud data flat file 1205b. Because data files can become very large, database file types other than SQL may be considered. For large projects in particular, including, for example, multiple very large drawing files, some typical SQL databases may run into size limitations, and therefore other databases or storage schemes may be more appropriate. For example, a metadata directory/table can be kept in an SQL DB that points to externally stored large files on a file system containing all the respective files. For most ordinary small-scale use, a typical SQL database is most efficient and simplest. Sensor raw data file 1206a is received from a robotic device, and data format 1206b is generally sensor-specific metadata from the specific data collection process. The set of tools shown in FIG. 12 enables movement of the data between a sparse point cloud model (discussed in greater detail below, in the description of FIG. 15) and a vectorized object model, for better manipulation, editing, etc.

Figure 13:
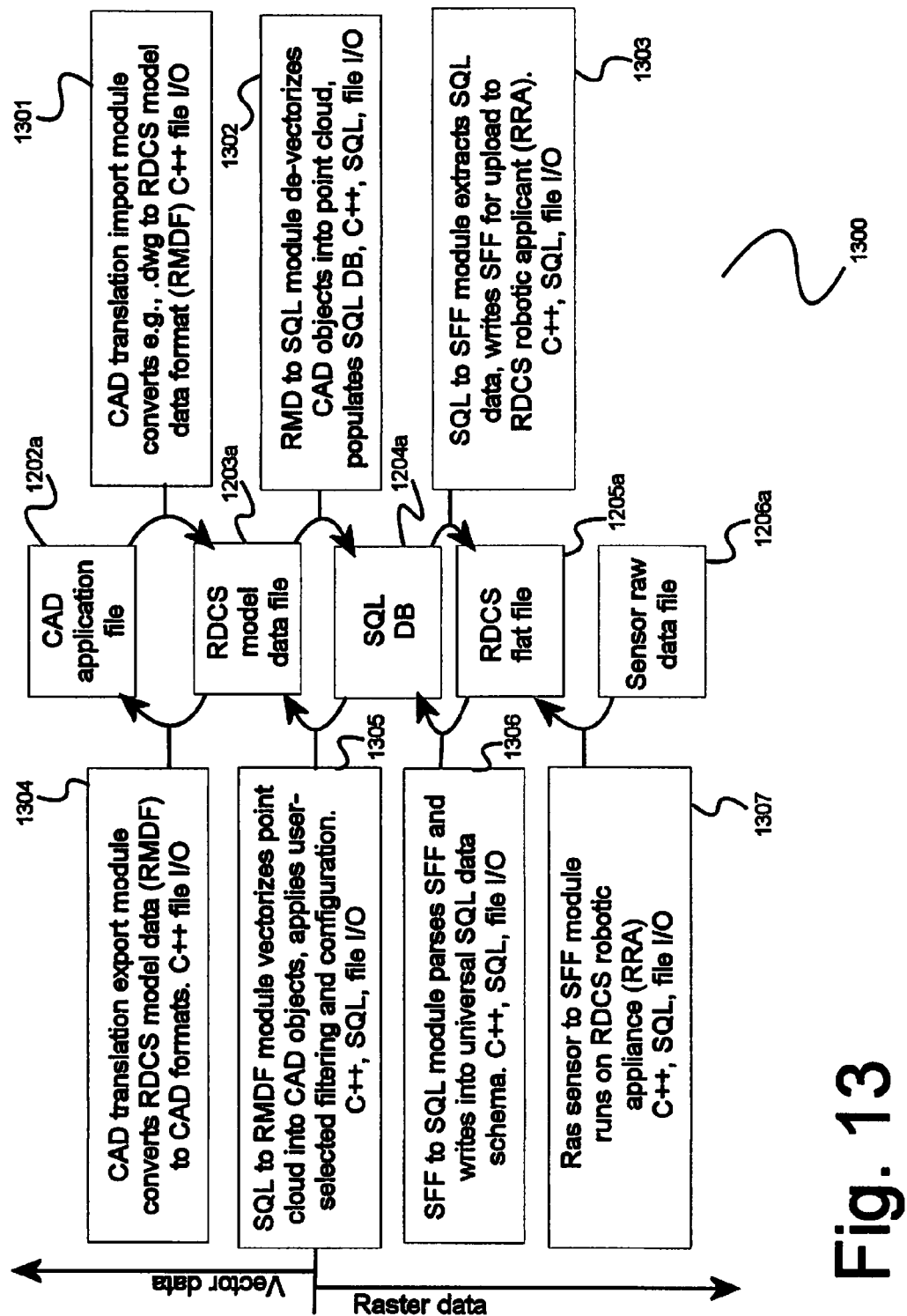
FIG. 13 shows an overview of interactions between various exemplary file types and associated modules, according to an embodiment of the invention.

FIG. 13 shows an overview of interactions 1300 between various exemplary file types listed as 1202a through 1206a and (by doing conversions in one direction) associated modules 1304, 1305, 1306, and 1307, according to an embodiment of the invention. Similarly, doing conversions in the other direction, file types 1202a through 1206a interact with modules 1301, 1302, and 1303. There is only an upward interaction from file type 1206a to type 1205a: it does not make sense to create sensor data from a flat file, because the sensor cannot process data from such a file. Such a conversion may be used, for example, to drive a 3D printer to create models, but it is not applicable is this instance.

Figure 14:
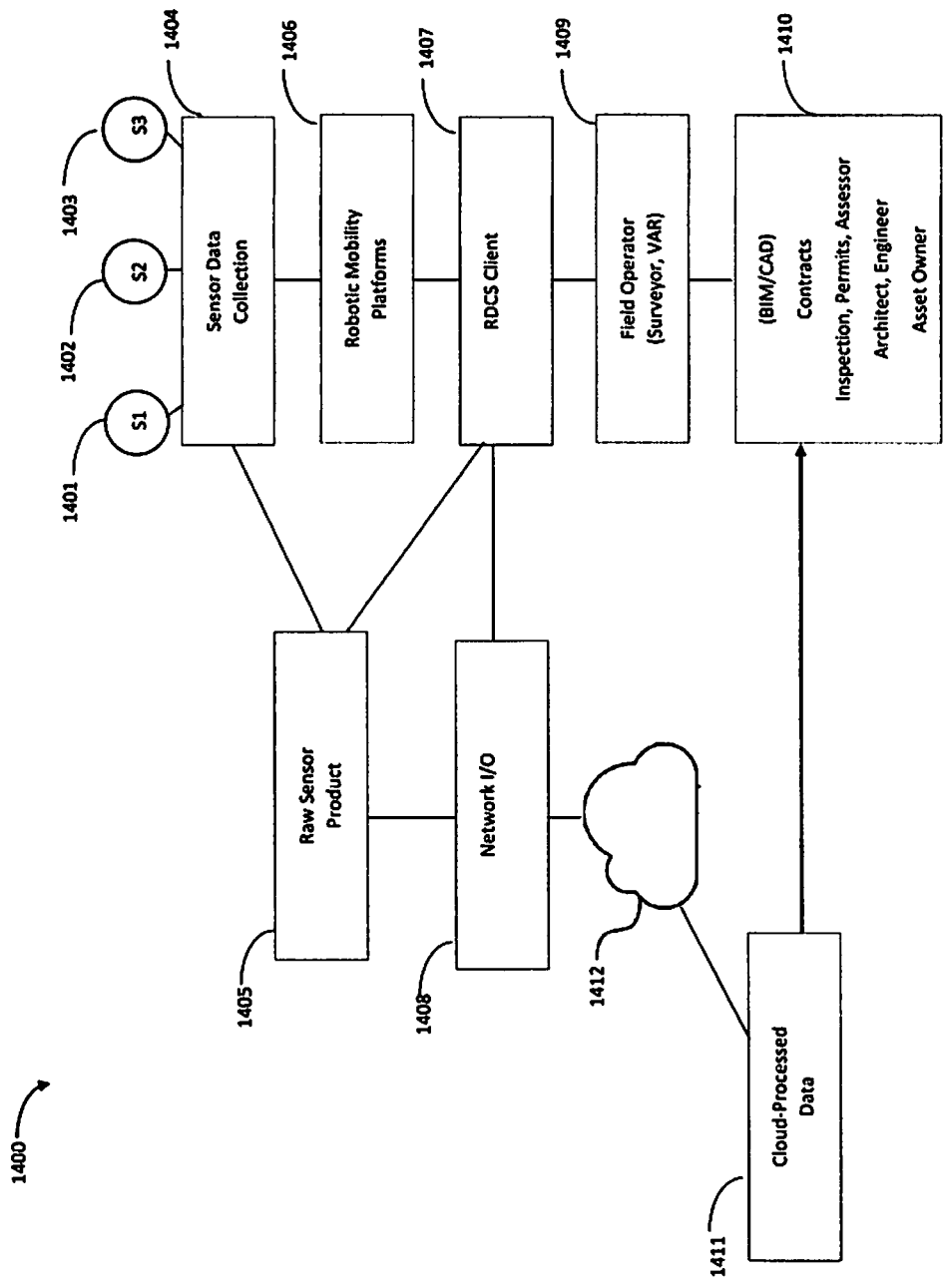
FIG. 14 is an architectural diagram of an exemplary ERDCS system, according to an embodiment of the invention.

FIG. 14 is an architectural diagram of an exemplary ERDCS system 1400, according to an embodiment of the invention. Sensors 1401, 1402, and 1403 feed data into sensor data collection module 1404, integrated into robotic mobility platforms 1406, which in turn interfaces with ERDCS client 1407. These module interact with raw sensor product 1405 and send data via network I/O 1408 or other suitable paths and networks, as needed and available to cloud 1412 or other suitable storage facility. Module 1411 can retrieve data processed by the above-named modules from cloud 1412 and transfer said data to module 1410. Module 1409 is field operators, such as, for example, surveyor, VARs, etc. that may have additional functionality; while in module 1410 integration into the building information management and computer aided design (BIM/CAD) functions occurs. In this module entities and functions such as, for example, contracts, inspection, permits, assessor, architect, engineer, and asset owner all work and interact with one another as required.

Data Association Approach

In some cases, software for associating collected data with a design model is used, so that possible non-point entities in the model, such vector defined objects, are discretized. This software may be any number of off-the-shelf vector to three-dimensional conversion programs, and some CAD software has built in conversion programs. These programs may be, but are not limited to, any of the following: gmsh, a library to help create the point cloud; opencascade, a library to read and manipulate CAD models; jsoncpp, a library to parse json files; openmpi, a library for handling parallel communications between processors; and libcsv_parser, a library to parse .csv files.

When a CAD model is converted into a mesh, and then the lines of the mesh are deleted, leaving discrete points, each of these points is given metadata about whether it is in, on, or outside a solid object, which can be added as metadata or tag to that point. Then, an algorithm decides if a particular point should be decorated (meaning additional metadata or tags are added) with any of the sensor data taken based on the sensor type and the proximity. Other methods may be used to achieve the same end, namely to tie metadata to points (or very nearby). Depending on the type of data, metadata, data presentation etc. other approaches may be more efficient. For example, an air temperature sensor may decorate points within a sphere for points with metadata that indicate they are outside an object. Those points can then be converted into points belonging, for example, to a point cloud, and additional points are created in negative space such that these points can be then associated by proximity to collected data (in the physical space) which may exist in point, volume or other forms, such that meaningful association is performed due to the specifications of each data collection device. For example, an air temperature thermometer meaningfully associates readings only with the negative space around an object and not within an enclosed object. All the various formats can be converted to a point-cloud type of system, then associated by proximity, enabling the system to decorate all relevant points with all kind of collected data.

This approach solves the non-trivial problem of how to augment a design model, which may contain non-point entities such as vector defined objects, with collected data, such as created a point or area collection device, e.g. a thermometer, such that both objects and negative space can have be augmented by correct associated data depending on the specifications of the collection device.

Figure 15:
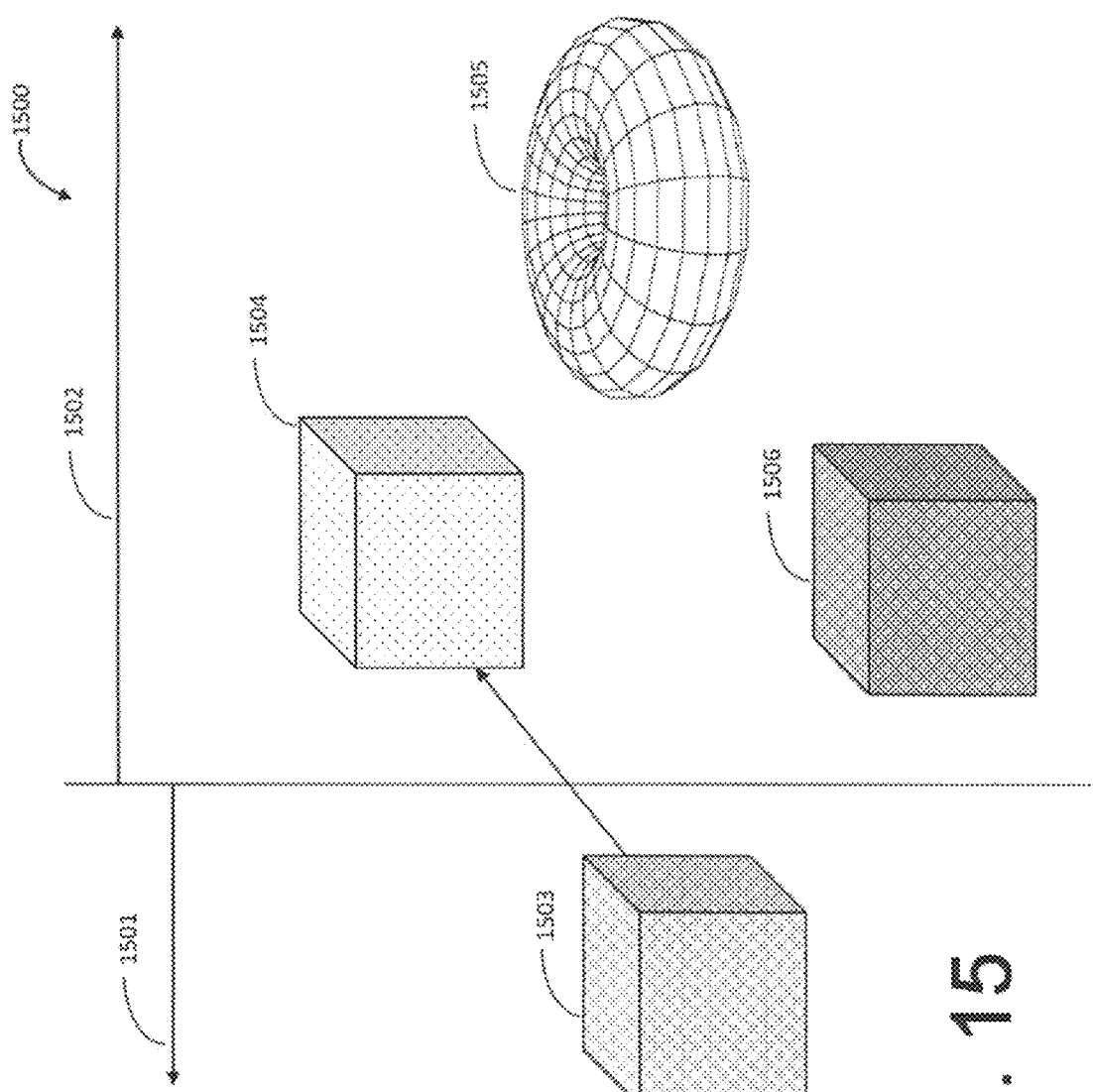
FIG. 15 shows an overview of the association of data types, including BIM/CAD models, sensor data, and LiDAR points, for rendering according to an embodiment of the invention.

FIG. 15 shows an overview of the association of data types 1500, including BIM/CAD models, sensor data, and LiDAR points, for rendering according to an embodiment of the invention. Data types are grouped on a vector side along axis 1501 and on a point side along axis 1502. CAD object 1503, on the vector side, is representative of any of many types of CAD objects that can make up a model, such as, for example, various types of plans, layers, etc. CAD object 1503 may be rasterized and converted into point cloud 1504. Point cloud 1504 is contrasted/complemented by "noisy" LiDAR-generated point cloud of objects 1506, which has been collected, for example by a robot, or in some cases in other ways, for example a tripod. Point clouds 1504 and 1506 may be combined, if they are both available, into a single mission-generated sparse point data cloud 1505 where the noisy points and unimportant points are removed. In some cases, only one of the point clouds may be available, or only some parts of the physical object may be available in both point clouds 1504 and 1506. The system attempts to combine the best possible data for maximum completion of sparse point data cloud 1505. A sparse point data cloud is generally the preferred way to collect sensor data, but it makes human manipulation, such as editing, manipulation, clean up, etc. more difficult.

A CAD vector object may be converted to a point cloud to enable point-to-point association and display methods with LiDAR and sensor sources. Such conversions may add in points in negative space to enable sensor reading of negative space, such as, for example, air, to have something to associate with. Fill choices would be sparse, medium and dense. A discretized cloud would have x, y, and z points with properties such as "in object," "object," and "outside object." In some cases this approach can be expanded and generalized. Objects may need to know their nesting level of 'in', and the notion of 'in' as well as 'negative space' is material and sensor-dependent. For example, wallboard is negative space to a capacitive stud finder, but 'in object' to an ambient thermometer. Many variations and modifications can be made to this novel schema, without departing from its spirit. Sensor data could then be associated through the x, y, z locations in the discretized cloud. A cloud point that received no properties, or was not decorated, meaning it had no added metadata making it relevant, could be culled, and the cloud could be exported with each point converted to one vector object. This culling effectively reduces the noise of the data in the sparse point cloud model and thus also reduces the size of the data. In some cases, fill choices of sparse, medium, or dense would be needed to control the number of points and or their vectors, collectively objects, for rendering performance. In some cases, making the density choices non-homogeneous may be considered, for example, by having more points at the surface of an object versus the center of a large negative space. The user interface could offer selections for which sensor data files to use to overlay on the discretized point cloud, as initial granularity. In an enhanced version of the system discussed herein, any sub-selections would be permitted, based on objects. If no CAD model is available, a noisy LiDAR point cloud can stand in for the discretized cloud for association with sensor data points. In some cases, LiDAR can be a differential discrete model (a model that shows detected differences) to detect "as planned" vs. "as built".

Clash Detection

Figure 16:
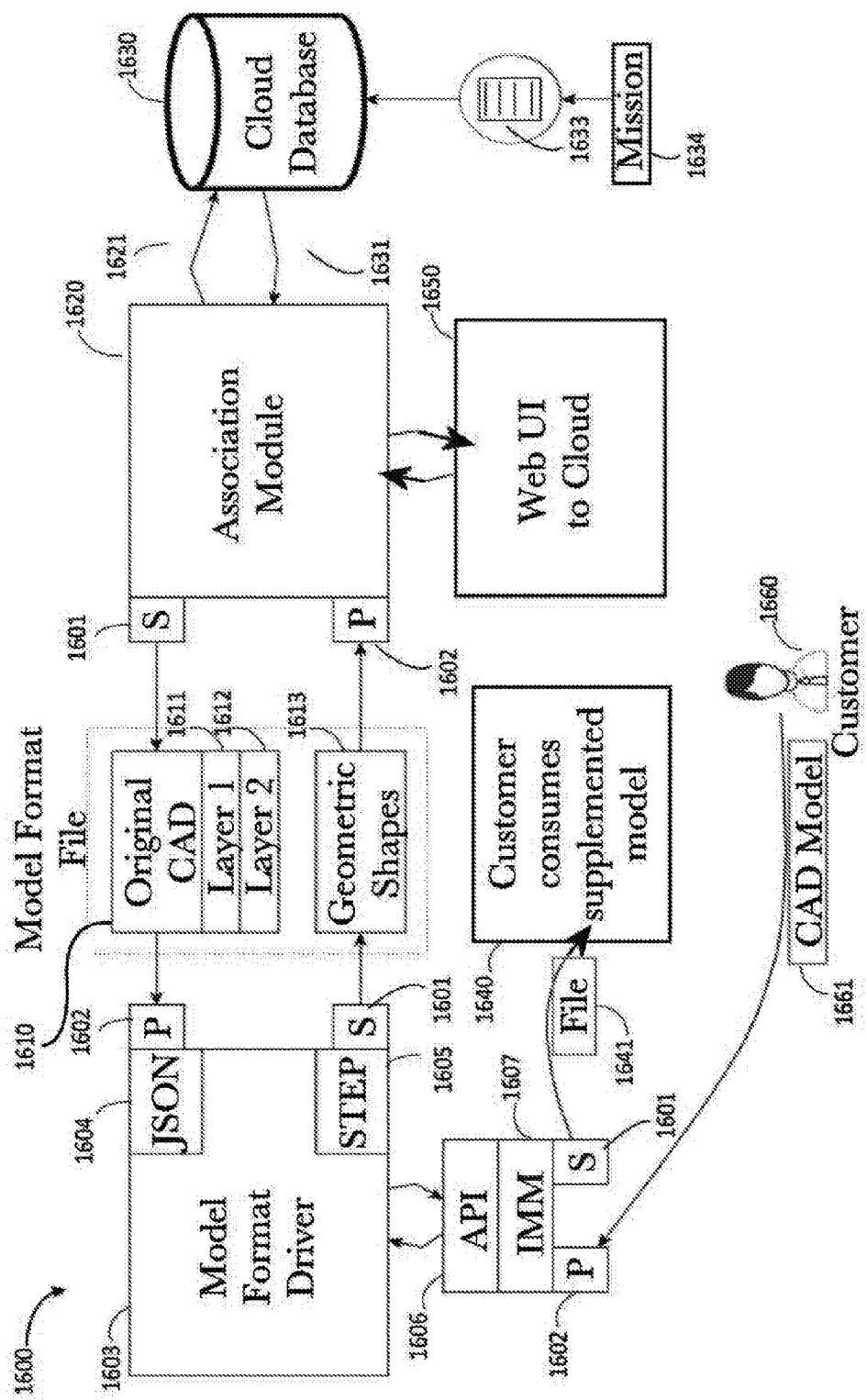
FIG. 16 shows a more refined version of the system architecture according to an embodiment of the invention.
Figure 17:
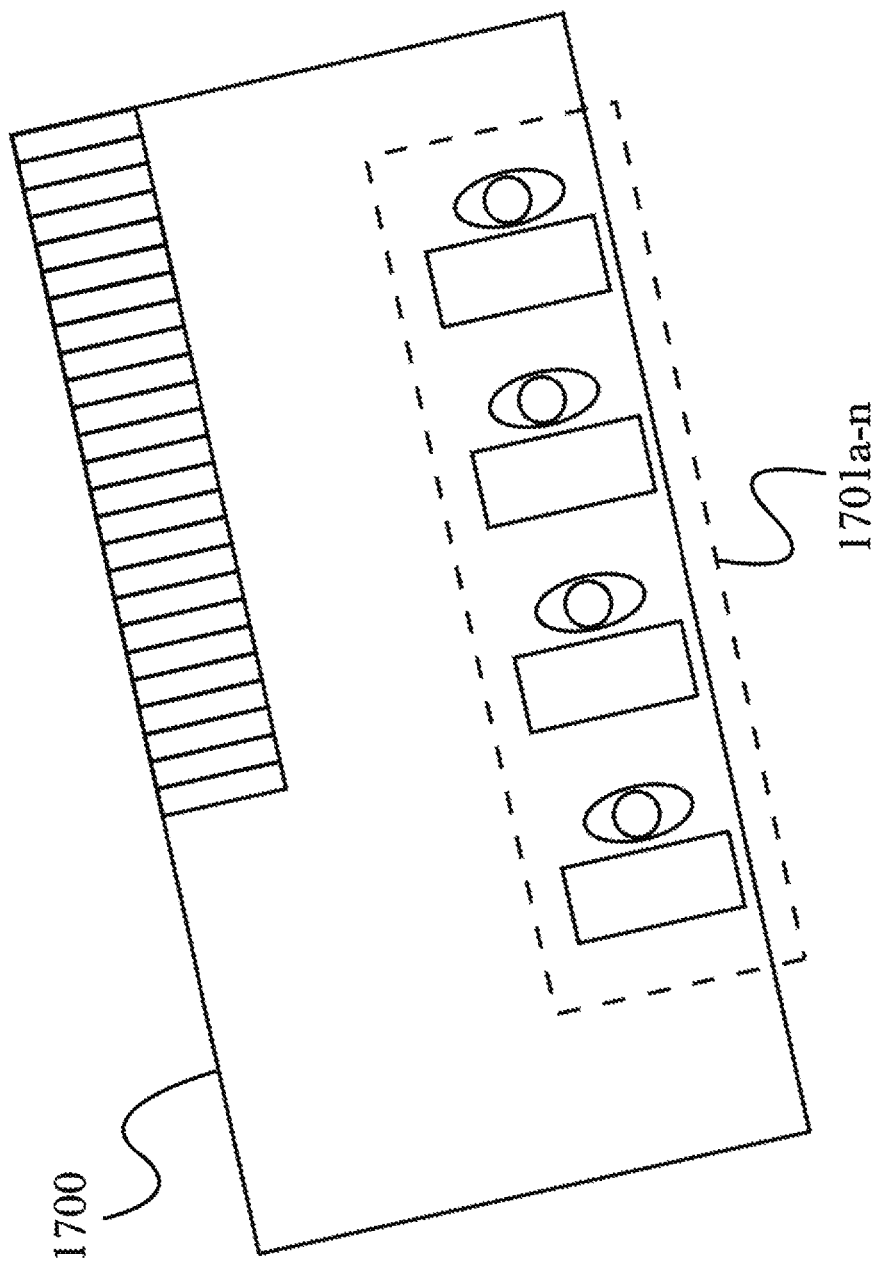
FIG. 17 shows an exemplary design of a LiDAR office scan, according to an embodiment of the invention.

FIG. 16 shows a more refined version of the system architecture according to an embodiment of the invention. In some instances of the ERDCS, a "clash detection" or "difference detection" approach may be utilized, using one or more programs (for example, association module 1620) with algorithms for detecting differences between as-planned and as-built for construction of physical objects, such that the output of data collection devices, e.g. LiDAR units, can be programmatically differenced with a design model to determine if what has been built matches what was intended to be built. Typically, surfaces and objects in a point cloud generated from a LiDAR scan are identified using proximity comparisons to determine matching identities of objects in the "as planned" CAD model. Objects outside a defined tolerance, or flagged as anomalous using machine learning algorithms, are logged and saved. This approach solves the non-trivial problem of how to detect differences between a vectorized CAD model and a noisy point cloud created by the LiDAR unit, and in a way much faster than before possible. In absence of a clean CAD model, in some cases, for example scanned analog (hard-copy) blueprints can be used to generate the as-planned model. In some situations, it may be more common to use LiDAR to facilitate construction of a model of a space with no existing model. For purpose of this section, how the model is created is not important. Additional manual cleanup may be required for such areas of discrepancies as, for example, a LiDAR scan containing "foreign" objects, such as tools, people, furniture, etc. present at the time of scan. Such objects should be removed for a clean comparison. FIG. 17, below, for example, shows several desks and a large table in the building, protruding up from the floor.

Model Object Persistence

In some cases, in an ERDCS, a method called Model Object Persistence may be used to identify objects in a data collection device output which are the same objects from a previous collection or from a design model that may contain non-point entities such as vector objects. This approach enables determination of which objects are seen in a noisy LiDAR scan, those objects that persisted across multiple scans and times, or objects reconciled with a vector model. Such a determination can be a very difficult task, but the conversion to vectorized objects makes it easier. However, some scan sites can be highly transitive, and object persistence detection might not be deterministic given only LiDAR, consider the difference between moving one chair or swapping and moving one. In some cases, for example, objects may get tagged, with optical, magnetic or RFID type tags or in other cases by adding sensors that can recognize materials, fingerprint type signatures etc.

Figure 18:
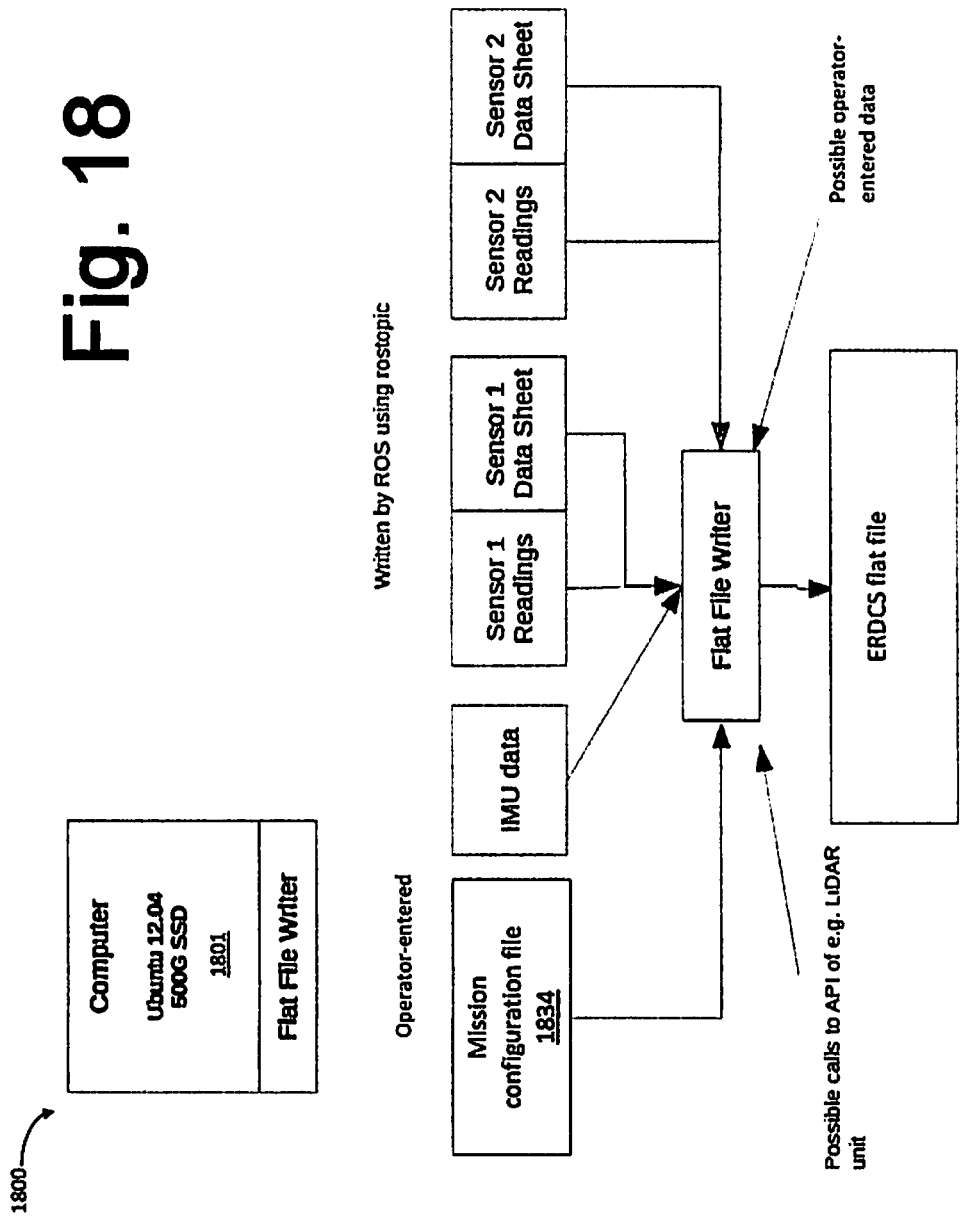
FIG. 18 is a diagram of exemplary flat file writer (FFW) architecture, according to an embodiment of the invention.
Figure 19:
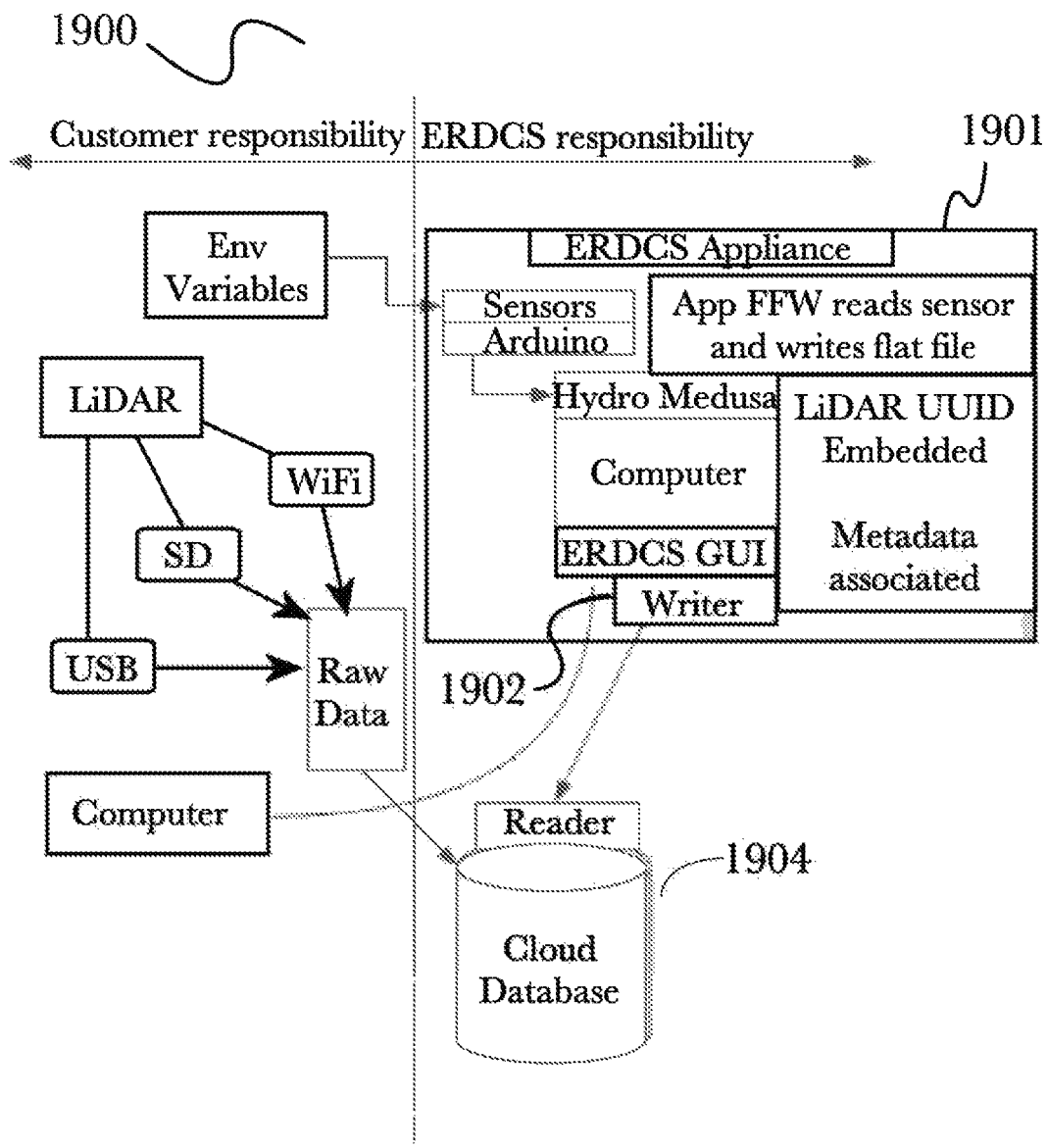
FIG. 19 is a diagram of data flow from the ERDCS computing device into the ERDCS cloud and then to a server, according to an embodiment of the invention.

FIGS. 16, 18 and 19 should be seen as different views of diagrams of exemplary system architecture 1600, according to one aspect of the system and method disclosed herein.

IMU Normalization Approach

An algorithm takes as input one or more arbitrary data collection device data files and a continuous positional data device, such as an IMU (Inertial Measurement Unit), and normalizes the data collection devices' data with the time and positional data from the continuous positional data device, such that each entry in the data collection device file is augmented with correct positional information. This approach solves the non-trivial problem of knowing the position of a data collection device in relation to the model at any given time, which is necessary for accurate association of data with a model. In some cases, manual correction of the local world coordinates may be required; in other cases, markers, beacons, or fiduciary markings can be used to enable the system to self-align, and in yet further cases, both approaches may be used. The IMU information can be combined with the point cloud information to enhance accuracy.

Mission Record Flat File

Mission record flat file 1633 is a formatted text file containing the mission record. The mission record is comprised of two elements at least: the mission configuration file, described below, and metadata generated about the mission during a mission. Additional data may be included, for example data used to set up and/or document a mission etc. This metadata may include the start and end time of mission and additional position data, which additional data may comprise, for example, additional monuments; initial and final position and orientation of platform; data collection device data records; possible continuous positional information as collected, for example, by an IMU; source locations of the data records; data sheet information with specifications of configured data collection devices; log of errors and warnings encountered during processing; data integrity checking information; file format version information; and names of all output files. In some cases, the sensor data output files can be included as a compressed bundle, alongside the Mission Record file.

For details about Mission 1634, see the description of the Mission Configuration File 1834 in the discussion of FIG. 18, below.

RDCS Model File

The model file(s) 1610-1613 also in a slightly different version 1203a-b is a formatted text file capable of holding information found in one or more model format files, such as .dwg, .dgn, .stp, capable of lossless translation, and additionally holding optional associated data from collection devices such that the associated data is positionally registered with the design model. A computer program 1603 reads any of a number of existing formats for CAD models, and can inject ERDCS mission-generated data for persistence in any number of user-requested formats.

This system can be used for example to find problems during construction. For example, a temporary support beam under load may bend out of shape and interfere with a concrete mold for a future permanent support that must be constructed. Another example may be a temporary electrical junction box located where a hole needs to be drilled for a permanent supply line. By periodically scanning large construction sites, and finding these interferences between temporary, somewhat moveable objects and spaces needed for the permanent construction early on, delays can be reduced or avoided, as well as costly mistakes. The resolution in many cases is that one or more trades/subcontractors need to move the temporary object to be in full compliance. In rarer instances the final object may be modified to avoid conflict. Use of this file solves the non-trivial problem of how to associate collected data with a wide variety of persistent formats and augment design models that may contain vector entities.

FIG. 17 shows an exemplary design of a LiDAR office scan 1700, according to an embodiment of the invention. This example illustrates the discussion, above, of the ERDCS model file. FIG. 17 shows such areas of discrepancies 1701a-n, as a LiDAR scan may contain "foreign" objects, such as tools, people, furniture, etc., as in this example, or temporary construction objects as discussed above, present at the time of the scan. Each discrepancy or interference needs to be looked at, as it may resolve itself based on scheduling. For example, a temporary support may be removed before a planned new object is built, or it may not, thus requiring intervening action.

FIG. 18 is a diagram of exemplary flat file writer (FFW) architecture 1800, according to an embodiment of the invention. Flat file writer (FFW) application 1801 is, in this example, written in C++ programming language, but any other suitable or desired programming language or system may be used instead. It runs on the ERDCS computing device, or in some cases on a physical or virtual server, consolidating data from data files placed in the cloud service discussed throughout and sensor data files written by robotic, and possibly also from operator-entered or manually gathered data. The Mission Configuration File 1834 is a formatted text file, containing information about mission-specific and platform configuration, including relative location of data collection devices on a platform, number of devices, types of devices, frequency of readings, location of data collection device's persistent data, names of output files, mission origin information, model information to facilitate later association of data, unit information, information on initializing or controlling possible third platform control applications related to data collection device, and possible data collection device conveyance. Combining the data as described in this file design solves the non-trivial problem of defining all the geometric, platform, data collection device, and third-party API information required to start a mission. The resulting mission record is necessary for performing accurate data association for a multiple data collection device platform despite optional conveyance of the platform.

Mission Configuration File

The Mission Configuration File 1834 is a formatted text file, containing information about mission-specific and platform configuration, including relative location of data collection devices on a platform, number of devices, types of devices, frequency of readings, location of data collection device's persistent data, names of output files, mission origin information, model information to facilitate later association of data, unit information, information on initializing or controlling possible third platform control applications related to data collection device, and possible data collection device conveyance. Combining the data as described in this file design solves the non-trivial problem of defining all the geometric, platform, data collection device, and third-party API information required to start a mission. The resulting mission record is necessary for performing accurate data association for a multiple data collection device platform despite optional conveyance of the platform.

FIG. 19 is a diagram of data flow 1900 from the ERDCS computing device 1901 into the ERDCS cloud 1904 and then to a server (not shown, but which, for example, could include any of a variety of cloud-based services or products comprising at least a server), according to an embodiment of the invention. At the conclusion of the mission, persistent LiDAR and sensor data is transferred by command of the operator in the ERDCS appliance GUI to the server/cloud, where the coordinate and vectorization process begins.

A computer program module 1902 that is part of the system takes the mission configuration file as input and uses it as the basis of metadata aggregating the artifacts of a mission in a way that scales appropriately for the types of data (primarily based on the size of the files), then parses/uses this memory structure using a standard data format (JSON). These memory objects are saved as a flat file, the mission record flat file. This file design solves the non-trivial problem of defining a single data set spanning all aspects of a mission, such as mission configuration; traceability information; positional information, such as that needed to perform accurate data association; platform configuration; data collection device specifications; mission data output; domain-specific information, such as additional monument definition; mission metadata such start and end time of mission, name, description; and data integrity checks.

Raw distance data is transferred to the ERDCS appliance via operator during or after a mission, depending on the capabilities of the unit. The transfer may be operator-initiated via WiFi, manual transfer of SD/media card, or USB cable.

Mission data persists on the ERDCS appliance prior to transfer to the server/cloud for processing. LiDAR written file is renamed to unique mission ID by the ERDCS appliance ingest program. Typically, a customer-supplied keyboard, mouse, and monitor are used to run the GUI application at the end of a mission. In some cases, the appliance is configured as a WiFi access point and serves the GUI using a webserver so that control of the appliance can also be mobile device, such as an iPad or Android tablet. Many variations can be made without departing from the spirit of the invention. The use of the GUI in this example is for the following purposes:

To initiate transfer or identify the LiDAR raw data file to the ERDCS computer.

To initiate the transfer of the mission data to the server or cloud.

In yet other cases, the GUI also may be used to drive the robot and ensure proper functional of the Robot Operating System software (ROS) etc.

Note in FIG. 19 that red objects are external to the ERDCS, while blue objects are ERDCS owned and/or controlled. Depending on case specific configuration, this separation may change, for example due to customer requirements and other business requirements such as an OEM of a robot etc.

It is clear that many modifications and variations of the system and method disclosed herein may be made by one skilled in the art without departing from the spirit of the novel art of this disclosure.

In some cases, the system may be used for planning missions by semi-autonomous vehicles, with each vehicle connected to a computer that sets parameters for each mission, such as starting position, ending position, averages for longer-range sensors, type of vehicle, maximum altitude, movement range and time, acceleration vectors, and braking vectors. For a mission, the computer draws from a data repository a file containing a rough layout and a file giving the vehicles' capabilities. The computer, as part of the mission planning, may generate an initial three-dimensional file to build an internal model of a structure and establish whether the vehicles can make clear movement passes around the solid parts of the structure. Additionally, the computer prompts the user to create obstruction zones as required for safety around such obstacles as power lines, cranes, construction superstructures, etc. The computer then processes the three-dimensional file to determine mission feasibility, based on the capabilities of vehicles. Subsequently, the three-dimensional file is processed again, using corrected and smoothed input data to create a series of waypoints at the desired resolution (i.e., one per meter, 10 per meter, etc.), with each waypoint an absolute location (as best determined by available data). In addition, the file may contain a three-dimensional heading and speed vector structure and a relative timestamp.

These modifications and variations do not depart from its broader spirit and scope, and the examples cited here are to be regarded in an illustrative rather than a restrictive sense.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure may be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Changes and modifications may be made to the disclosed embodiments without departing from the scope of the present disclosure. These and other changes or modifications are intended to be included within the scope of the present disclosure, as expressed in the following claims.

The above examples of the present invention are used only as illustrations and in no way limit the scope of the patent claims that are presented below.

In some cases, a system for processing data coming from various sources and related to physical objects, such as, for example, buildings or civil engineering objects, including but not limited to bridges, roads, support and retaining walls, railroads, airports, etc., may be converted into a sparse point cloud model that combines all the source data. Further, superfluous data points, specifically points with no properties, may be removed as noise from the sparse point cloud model to make it smaller and more manageable. In addition, conversion routines may enable interactions between the sparse point cloud model and a vectorized object model for better manipulation, editing, etc.

In some cases, in a system for processing data related to physical objects from multiple sources, the data may be converted into a sparse point cloud mode. that contains all the data combined. These physical object may be, for example, buildings or civil engineering objects, such as bridges, roads, support and retaining walls, railroads, airports, etc. Then superfluous data points, in particular, point with no properties, may be removed as noise from the sparse point cloud model to make it smaller and more manageable. In some cases, conversion routines may enable a back and forth between the sparse point cloud model and a vectorized object model for better manipulation, editing, etc. Further, the data may be combined into a Mission Configuration File, which is a formatted text file that contains information about mission-specific and platform configuration, including relative location of data collection devices on a platform, number of devices, types of devices, frequency of readings, location of data collection device's persistent data, names of output files, mission origin information, model information to facilitate later association of data, unit information, information on initializing or controlling possible third platform control applications related to data collection device, and possible data collection device conveyance. Combining the data enables the system to define all the geometric, platform, data collection device and third party API information required to start a mission. The resulting mission record is necessary for performing accurate data association for a multiple data collection device platform despite optional conveyance of the platform. Additionally, in an RCDS, a Mission Record Flat File in a form of a formatted text file, contains the mission record, which contain the whole Mission Configuration File, metadata generated about the mission during a mission (such as start and end time of mission, additional positional data, e.g., additional monuments, initial and final position and orientation of platform, data collection device data records, possible continuous positional information, e.g., as collected by an IMU unit), source locations of the data records, data sheet information with specifications of configured data collection devices, log of errors and warning encountered during processing, data integrity checking information, file format version information, and names of all output files. Then a computer program module that is part of the RCDS takes the Mission Configuration File as input and uses it as the basis to build an in-memory structure of metadata aggregating the artifacts of a mission in a way that scales appropriately for at least some of the types of data. Further, a decision whether to build an in-memory structure, using a standard data format, such JSON, is primarily based on the size of the files. The file design enables definition of a single record spanning all aspects of a mission, such as mission configuration, traceability information, positional information, such as that needed to perform accurate data association, platform configuration, data collection device specifications, mission data output, domain-specific information, such as additional monument definition, mission metadata such start and end time of mission, name, description, and data integrity checks. Also, in an ERDCS, a Model File, containing text only, may be capable of holding information found in one or more CAD model files, such as .dwg, .dgn, .stp file types. This file is capable of lossless translation, as well as holding optional associated data from collection devices such that the associated data is positionally registered with the design model. This system may be used to find problems during construction. Further, a computer program that reads existing formats for CAD models files can also inject ERDCS mission-generated data with persistence in any number of user-requested formats. Also, a wide variety of different sensor data can be associated with a wide variety of persistent formats and augment design models that may contain vector entities.

While the above-mentioned description of the invention enables one of ordinary skill to make and use what the inventors consider presently to be the best mode thereof, those of ordinary skill may understand and appreciate the existence of variations, combinations, and equivalents of the specific embodiment, method, and examples herein.

The invention should therefore not be limited by the above described embodiments, method, and examples, but by all embodiments and methods within the scope and spirit of the invention.

What is claimed is:

1. A system for robotic device control and data acquisition, comprising:
a plurality of network-connected hardware sensors;
a network-connected robotic device control system computer comprising a processor, a database, a memory, and program code, wherein the program code, when executed by the processor, causes the processor to:
receive, from the plurality of network-connected hardware sensors, via the network, a plurality of sensor-based data point clouds, each point cloud comprising a plurality of sensor-based data points associated to a physical object via the network;
an enhanced network-connected robotic device control application computer comprising another processor, a database, a memory, and another program code, wherein the another program code when executed by the another processor, cause the another processor to:
receive, via the network, the plurality of sensor-based data point clouds from the robotic device control system computer, and
for at least a portion of the plurality of sensor-based data point clouds of each point cloud, add one or more properties, the one or more properties comprising information whether a data point is in, on, or outside the physical object;
a network-connected database computer comprising a further processor, a database, a memory, and further program code, wherein the further program code when executed by the further processor, cause the further processor to:
store the plurality of sensor-based data point clouds received from the robotic device control system and the enhanced robotic device control application computer,
wherein at least the plurality of sensor-based data point clouds are stored according to a sparse-point model,
wherein upon only a subset of the plurality of sensor-based data points from a first point cloud corresponding to the physical object are available, the plurality of sensor-based data point clouds from a second point cloud are combined with the plurality of sensor-based data point clouds from the first point cloud to form an enhanced data point cloud to achieve a best possible point cloud for maximum completion of the enhanced data point cloud associated to the physical object,
wherein superfluous sensor-based data points of the plurality of sensor-based data points are removed as noise from the sparse point cloud model,
wherein sensor-based data points with no properties are removed from the sparse point cloud model,
wherein at least a portion of the second point cloud comprises one or more sensor-based data points not available in the first point cloud, and
wherein the enhanced robotic device control application computer converts at least the sensor-based data for each point cloud between the sparse point cloud model and a vectorized object model in a two-way reversible manner to optimize data processing for data originated from the plurality of network-connected hardware sensors associated to the physical object.

2. The system of claim 1, wherein the physical object is a civil engineering structure.

3. The system of claim 1, wherein a database comprises at least a relational database.

4. A method for robotic device control and data acquisition, comprising steps of:
receiving, at a robotic device control system including a plurality of network-connected hardware sensors via a network, a plurality of point clouds, each point cloud comprising sensor-based data;
for each point cloud, processing, at the robotic device control system, a plurality of sensor-based data;
for at least a portion of the plurality of sensor-based data, adding, by an enhanced robotic device control application computer, one or more properties, the one or more properties comprising information whether a data point is in, on, or outside an associated physical object;
storing, in a database computer, the sensor-based data for each point cloud in a sparse-point model;
upon only a subset of sensor-based data points from a first point cloud corresponding to the physical object are available, combining, by the enhanced robotic device control application computer, sensor-based data points from a second point cloud with sensor-based data points from the first point cloud to form an enhanced data point cloud to achieve a best possible point cloud for maximum completion of the enhanced data point cloud associated to the physical object, wherein at least a portion of the second point cloud comprises sensor-based data points not available in the first point cloud; and
converting at least the sensor-based data for each point cloud, using the enhanced robotic device control application computer, between a vectorized model and the sparse-point model in a two-way reversible manner to optimize data processing for data originated from the plurality of network-connected hardware sensors associated to the physical object.

5. The method of claim 4, further comprising step of producing a plurality of mission record flat files based at least in part on received sensor-based data, the flat files comprising a plurality of data pertaining to the plurality of sensor-based data.

6. The method of claim 5, further comprising step of building a memory structure of data comprising at least a portion of the plurality of sensor-based data, the memory structure being based at least in part on a mission record flat file.

7. The method of claim 6, further comprising step of building the memory structure based at least in part on a size of at least a memory flat file.

* * * * *